(12) United States Patent
Yoeli

(10) Patent No.: US 7,946,528 B2
(45) Date of Patent: May 24, 2011

(54) FLIGHT CONTROL SYSTEM ESPECIALLY SUITED FOR VTOL VEHICLES

(75) Inventor: Raphael Yoeli, Tel-Aviv (IL)

(73) Assignee: Urban Aeronautics, Ltd., Yavne (IL)

( * ) Notice: Subject to any disclaimer, the term of this patent is extended or adjusted under 35 U.S.C. 154(b) by 456 days.

(21) Appl. No.: 11/405,003

(22) Filed: Apr. 17, 2006

(65) Prior Publication Data

US 2007/0034734 A1 Feb. 15, 2007

Related U.S. Application Data

(60) Provisional application No. 60/671,484, filed on Apr. 15, 2005.

(51) Int. Cl.
*B64C 13/16* (2006.01)
*G05D 1/00* (2006.01)
(52) U.S. Cl. .................. 244/76 R; 244/195; 244/194
(58) Field of Classification Search ............. 244/23 A, 244/23 B, 23 C, 23 D, 76 R, 195, 194
See application file for complete search history.

(56) References Cited

U.S. PATENT DOCUMENTS

| | | |
|---|---|---|
| 2,077,471 A | 4/1937 | Fink |
| 2,734,705 A | 2/1956 | Robertson |
| 2,777,649 A | 1/1957 | Williams |
| 2,936,969 A | 5/1960 | Griffith et al. |
| 2,939,649 A | 6/1960 | Shaw |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,039,537 A | 6/1962 | Heidelberg |
| 3,139,244 A | 6/1964 | Bright |
| 3,161,374 A | 12/1964 | Allred et al. |
| 3,167,273 A | 1/1965 | Calderon |
| 3,174,573 A | 3/1965 | Chaplin |
| 3,179,353 A | 4/1965 | Peterson |
| 3,179,354 A | 4/1965 | Alvarez-Calderon |
| 3,184,183 A | 5/1965 | Piasecki |
| 3,198,082 A | 8/1965 | Kerris |
| 3,201,067 A | 8/1965 | Meyerhoff |
| 3,203,645 A | 8/1965 | Shaw |
| 3,231,221 A | 1/1966 | Platt |

(Continued)

FOREIGN PATENT DOCUMENTS

EP 0 236 583 9/1987

(Continued)

OTHER PUBLICATIONS

Edward D. Flinn, "Revolutionary X-Hawk Hovers Near Success," Aerospace America, Jul. 2003, pp. 26-28.

(Continued)

*Primary Examiner* — Tien Dinh
(74) *Attorney, Agent, or Firm* — Nixon & Vanderhye, P.C.

(57) ABSTRACT

Flight control systems have plural control subsystems with redundancies organized so as to provide continued but degraded control power over critical aircraft flight operating parameters even if any one complete control subsystem catastrophically fails. One example described in detail for a VTOL craft includes four groups of controls, each group comprising inputs relating to six degrees of freedom of the vehicle, at least one control computer and a plurality of actuators; each group utilizing 25% of required flight control power for the vehicle.

18 Claims, 27 Drawing Sheets

U.S. PATENT DOCUMENTS

| | | | |
|---|---|---|---|
| 3,244,246 A | 4/1966 | Weiland |
| 3,262,657 A | 7/1966 | Anker-Holth |
| 3,265,329 A | 8/1966 | Postelson-Apostolescu |
| 3,289,977 A | 12/1966 | Staats |
| 3,383,074 A | 5/1968 | Coplin |
| 3,397,852 A | 8/1968 | Katzen |
| 3,397,854 A | 8/1968 | Reyle |
| 3,454,238 A | 7/1969 | Goodson |
| 3,519,224 A | 7/1970 | Boyd et al. |
| 3,559,921 A | 2/1971 | Timperman |
| 3,584,810 A | 6/1971 | Velton |
| 3,627,235 A | 12/1971 | Lippisch |
| 3,665,809 A | 5/1972 | Darlington et al. |
| 3,713,748 A | 1/1973 | Langley |
| 3,827,527 A | 8/1974 | Bertelsen |
| 3,873,049 A | 3/1975 | Horsdal |
| 3,912,201 A | 10/1975 | Bradbury |
| 4,043,421 A | 8/1977 | Smith |
| 4,194,707 A | 3/1980 | Sharpe |
| 4,505,442 A | 3/1985 | Kirsch et al. |
| 4,505,443 A | 3/1985 | Bradfield et al. |
| 4,598,890 A | 7/1986 | Herzog et al. |
| 4,754,940 A | 7/1988 | Deter |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,892,274 A | 1/1990 | Pohl et al. |
| 4,917,332 A | 4/1990 | Patterson, Jr. |
| 4,934,629 A | 6/1990 | Brant |
| 5,064,143 A | 11/1991 | Bucher |
| 5,101,927 A | 4/1992 | Murtuza |
| 5,209,428 A | 5/1993 | Bevilaqua et al. |
| 5,297,761 A | 3/1994 | Kendall, Jr. et al. |
| 5,419,514 A | 5/1995 | Ducan |
| 5,454,531 A | 10/1995 | Melkuti |
| 5,666,483 A | 9/1997 | McClary |
| 5,746,390 A | 5/1998 | Chiappetta |
| 5,806,805 A | 9/1998 | Elbert et al. |
| 5,890,441 A | 4/1999 | Swinson et al. |
| 6,089,501 A | 7/2000 | Frost |
| 6,105,901 A | 8/2000 | Ulanoski et al. |
| 6,119,985 A | 9/2000 | Clapp et al. |
| 6,170,778 B1 * | 1/2001 | Cycon et al. ............... 244/6 |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,431,494 B1 | 8/2002 | Kinkead et al. |
| 6,446,911 B1 | 9/2002 | Yount et al. |
| 6,457,670 B1 | 10/2002 | Geranio et al. |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,974,105 B2 | 12/2005 | Pham |
| 7,246,769 B2 | 7/2007 | Yoeli |
| 7,249,732 B2 | 7/2007 | Sanders, Jr. et al. |
| 7,267,300 B2 | 9/2007 | Heath et al. |
| 7,275,712 B2 | 10/2007 | Yoeli |
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |
| 2004/0155143 A1 | 8/2004 | Yoeli |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0178881 A1 | 8/2005 | Yoeli |
| 2005/0242231 A1 | 11/2005 | Yoeli |
| 2006/0113426 A1 | 6/2006 | Yoeli |
| 2006/0231675 A1 | 10/2006 | Bostan |
| 2007/0034739 A1 | 2/2007 | Yoeli |
| 2007/0095971 A1 | 5/2007 | Yoeli |
| 2007/0158494 A1 | 7/2007 | Burrage |
| 2008/0054121 A1 | 3/2008 | Yoeli |
| 2008/0142643 A1 | 6/2008 | Yoeli |
| 2008/0283673 A1 | 11/2008 | Yoeli |
| 2009/0084907 A1 | 4/2009 | Yoeli |
| 2009/0140102 A1 | 6/2009 | Yoeli |
| 2009/0159757 A1 | 6/2009 | Yoeli |
| 2010/0051740 A1 | 3/2010 | Yoeli |
| 2010/0051753 A1 | 3/2010 | Yoeli |
| 2010/0076625 A1 | 3/2010 | Yoeli |
| 2010/0270419 A1 | 10/2010 | Yoeli |

FOREIGN PATENT DOCUMENTS

| | | |
|---|---|---|
| EP | 0 922925 | 6/1999 |
| GB | 935884 | 9/1963 |
| GB | 951186 | 3/1964 |
| IT | 666076 A | 8/1964 |
| IT | 666076 A | 8/1964 |
| WO | WO 01/93039 A1 | 12/2001 |
| WO | WO 02/096750 A2 | 12/2002 |
| WO | WO 02/098732 A2 | 12/2002 |
| WO | WO 03/016134 A1 | 2/2003 |
| WO | WO 2004/012993 A1 | 2/2004 |
| WO | WO 2004/031876 A1 | 4/2004 |
| WO | WO 2005/039972 A2 | 5/2005 |
| WO | WO 2006/072960 A2 | 7/2006 |
| WO | WO 2006/131920 | 12/2006 |
| WO | WO 2007/052271 A2 | 5/2007 |
| WO | WO 2007/099543 A2 | 9/2007 |
| WO | WO 2007/129313 A2 | 11/2007 |
| WO | WO 2008/065654 A2 | 6/2008 |
| WO | WO 2008/065664 A2 | 6/2008 |
| WO | 2008/135973 A2 | 11/2008 |
| WO | WO 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

Raymond L. Robb, "Driving On Air: 20th Century Flying Carpets," Vertiflite, vol. 51, No. 1, Spring 2005, pp. 2-11.

Urban Aeronautics Ltd., "The X-Hawk VTOL Utility Vehicle"—product description and specifications, 2004.

Piasecki Aircraft Corporation Product Description and History for Piasecki VZ-8 VTOL research vehicle (undated).

International Search Report for International Application No. PCT/IL02/00417 (now WO 02/096750 (Yoeli)), dated May 23, 2003, published Oct. 2, 2003.

Written Opinion in International Application No. PCT/IL02/00417 (now WO 02/096750 (Yoeli)), Aug. 19, 2003.

International Preliminary Examination Report for International Application No. PCT/IL02/00417 (now WO 02/096750 (Yoeli)), Oct. 20, 2003.

Corrected International Preliminary Examination Report for International Application No. PCT/IL02/00417 (now WO 02/096750 (Yoeli)), Jul. 25, 2004.
International Search Report for International Application No. PCT/IL02/000439 (now WO 2002/098732 (Yoeli)), dated Apr. 28, 2003, published Mar. 18, 2004.
International Preliminary Examination Report in International Application No. PCT/IL02/000439 (now WO 2002/098732 (Yoeli)), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876 (Yoeli)), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Copending U.S. Appl. No. 10/987,321 (Yoeli) filed at the U.S. Patent Office Nov. 15, 2004.
Copending U.S. Appl. No. 10/523,609 (Yoeli) filed at the U.S. Patent Office Feb. 7, 2005 (International Application date Aug. 5, 2003).
Copending U.S. Appl. No. 11/061,652 (Yoeli) filed at the U.S. Patent Office Feb. 22, 2005.
Copending U.S. Appl. No. 11/411,243 (Yoeli) filed Apr. 26, 2006 (International Application date Oct. 27, 2004).
Copending U.S. Appl. No. 11/447,311 (Yoeli) filed at the U.S. Patent Office Jun. 6, 2006.
International Preliminary Report on Patentability in International Application No. PCT/IL0600032 (now WO 2006/072960) (Yoeli), dated Sep. 11, 2006.
Written Opinion of the International Searching Authority in International Application No. PCT/IL0600032 (now WO 2006/072960) (Yoeli), dated Sep. 11, 2006.
International Search Report for International Application No. PCT/IL06/00663 (now WO 2006/131920) (Yoeli) dated Dec. 19, 2006.
Written Opinion of the International Searching Authority in International Application No. PCT/1L06/00663 (now WO 2006/131920) (Yoeli) dated Dec. 19, 2006.
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.

International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
Co-pending U.S. Appl. No. 11/794,906 (Yoeli) filed Jul. 9, 2007.
Co-pending U.S. Appl. No. 11/798,187 (Yoeli) filed May 10, 2007.
Co-pending U.S. Appl. No. 11/826,202 (Yoeli) filed Jul. 12, 2007.
Co-pending U.S. Appl. No. 11/892,414 (Yoeli) filed Aug. 22, 2007.
Written Opinion and Search Report of the International Searching Authority in International Application No. PCT/IL07/00271 (now WO 2007/099543 A2) (Yoeli) dated Oct. 28, 2008.
Written Opinion and Search Report of the International Searching Authority in International Application No. PCT/IL07/01475 (now WO 2008/065664 A2) (Yoeli) dated Sep. 2, 2008.
U.S. Appl. No. 12/224,549 (Yoeli) filed Nov. 4, 2008.
U.S. Appl. No. 12/226,952 (Yoeli) filed Feb. 27, 2009.
U.S. Appl. No. 12/516,257 (Yoeli) filed May 26, 2009.
U.S. Appl. No. 12/516,743 (Yoeli) filed May 28, 2009.
Corrected Written Opinion and Search Report of the International Searching Authority in International Application No. PCT/IL07/01475 (now WO 2008/065664 A2) (Yoeli) dated Jul. 27, 2009.
Written Opinion and International Search Report of the International Searching Authority in International Application No. PCT/IB08/055301 (now WO 2009/077968) (Yoeli) dated Aug. 14, 2009.
International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
Written Opinion and International Search Report of the International Searching Authority in International Application No. PCT/IB09/55656 (now WO 2010-067325 A2) mailed Sep. 30, 2010.
U.S. Appl. No. 12/938,444 (Yoeli) filed Nov. 3, 2010.
U.S. Appl. No. 12/989,533 (Yoeli) filed Oct. 25, 2010.
U.S. Appl. No. 12/747,830 (Yoeli) filed Jun. 11, 2010.
Written Opinion and International Search Report of the International Searching Authority in International Application No. PCT/IB09/053768 (Yoeli) (now WO 2010-026517 A2) dated Mar. 3, 2010.
Written Opinion and International Search Report of the International Searching Authority in International Application No. PCT/IB09/052346 (Yoeli) dated Oct. 20, 2009.
U.S. Appl. No. 12/549,872 (Yoeli) filed Aug. 28, 2009.
U.S. Appl. No. 12/598,514 (Yoeli) filed Nov. 2, 2009.

* cited by examiner

Fig. 31A
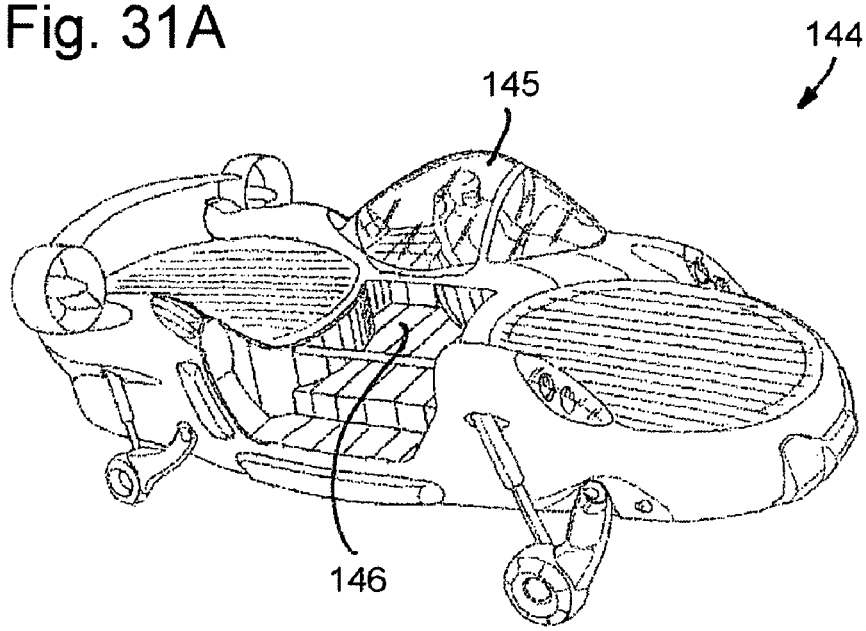
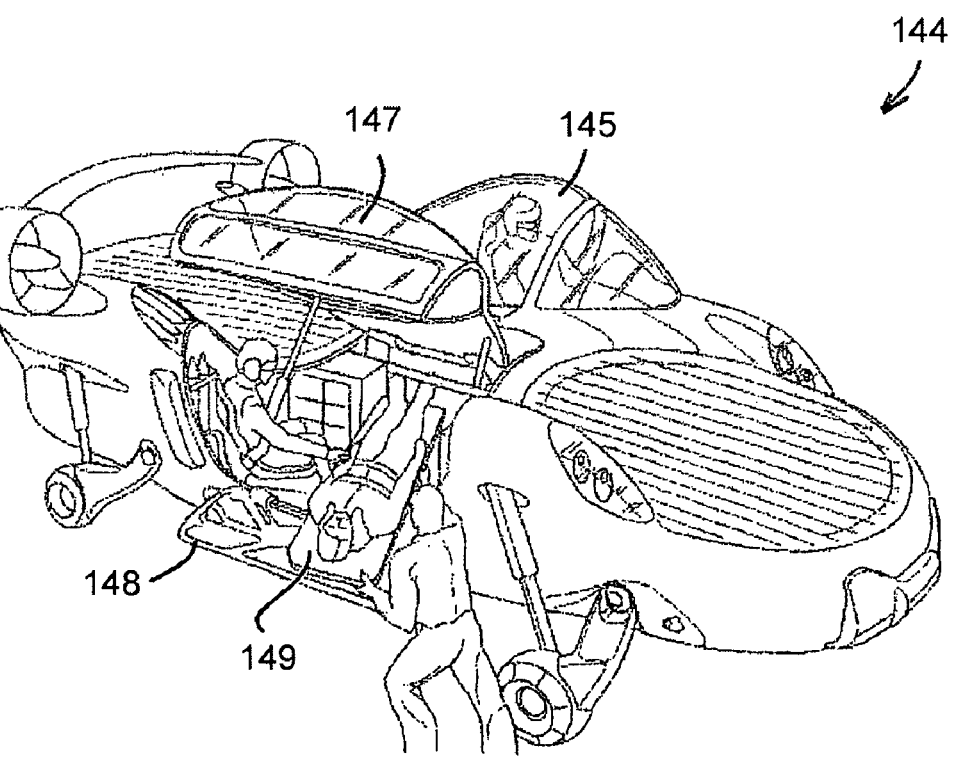
Fig. 31B

| 1.1 Controller | Hover & Low Speed Maneuver (LSM) | Forward cruise flight |
|---|---|---|
| Stick 161: Left-Right movement | Produces sideward motion by deflecting all vanes in direction of desired movement | Produces rolling motion by deflecting lower rows of vanes in direction opposite to upper rows of vanes |
| Stick 161: Fore-Aft movement | Produces Forward-Aft translation motion by varying pitch angle of blades on both rear mounted pusher propellers | Produces angular pitching motion by varying differentially pitch angle of blades on fore V.S. aft main lift rotors |
| Collective 163: Up-Down movement | Produces vehicle altitude change by varying collectively pitch angle of blades on fore and. aft main lift rotors | Produces vehicle altitude change by varying collectively pitch angle of blades on fore and. aft main lift rotors |
| Speed Controller 162: Fore-Aft movement | Establishes trimmed Forward-Aft speed by setting pitch angle of blades on both aft mounted pusher propellers | Establishes trimmed Forward-Aft speed by setting pitch angle of blades on both aft mounted pusher propellers |
| Pedals 159,160: Right-Left push (Alternative: Stick grip twist) | Produces angular yawing motion by deflecting differentially forward V.S. aft control vanes, as well as pitch on blades of right V.S. left pusher propellers | Produces angular yawing motion by deflecting differentially forward V.S. aft control vanes, as well as pitch on blades of right V.S. left pusher propellers |

Fig. 35

Fig 39  Group i

FLIGHT CONTROL SYSTEM ESPECIALLY SUITED FOR VTOL VEHICLES

RELATED APPLICATION

Priority is hereby claimed from U.S. Provisional Application No. 60/671,484, filed Apr. 15, 2005.

TECHNICAL FIELD

The present invention generally relates to control systems incorporating redundancy features for reliability and safety, and it more particularly relates to flight control systems for use with VTOL (Vertical Take-Off and Landing) vehicles.

BACKGROUND

For well over 100 years aircraft of numerous types have been proposed—and some have been successfully demonstrated and commercially practiced. However many proposed aircraft designs have been limited to paper proposals and/or one or a few demonstration models rather than achieving commercial practicality. This is perhaps especially the case for VTOL craft designs which often encounter onerous flight control requirements—especially when considering the options for a safe descent to landing after some critical aircraft system or subsystem failure.

The need for an effective, reliable and safe flight control system (FCS) is especially critical for modern fly-by-wire (FBW) or future fly-by-light (as optical fiber and/or solid state optical data communication and control circuitry becomes more commonly used) aircraft where control of all critical flight control parameters can be effected by computerized control systems. Pilot controlled input sensors (possibly located remotely in the case of un-manned aircraft) generate electrical command control inputs to a computer control system which also receives feedback electrical inputs representing the actual current state of the aircraft (e.g., its position, attitude, speed, etc). Based on such electrical inputs, the computerized control system generates electrical output signals that are routed to electromechanical actuators or other suitable transducers to control critical aircraft control parameters (e.g., aircraft control surfaces and systems, etc.).

Some very high performance aircraft designs are inherently nearly unstable and thus perhaps even incapable of sustained direct human control without such a FBW FCS. In an attempt to provide enhanced reliability and safety, redundancies have often been built into the FBW FCS. However such prior systems have typically attempted to maintain 100% control power (CP) of the entire aircraft in the event of a failure in one of the redundant sub-systems by substituting a backup subsystem for the failed one. Typically the process of deciding that a subsystem failure has occurred and what responsive action to take is also computerized (e.g., by a supervising computer system which itself might have some built in redundancy). The required complexity of hardware and software components for such a FBW FCS has led to inevitable design and/or implementation flaws that can cause, and have caused, catastrophic unexpected results.

For example, in a typical FBW FCS, particularly for aircraft with reduced or "relaxed" stability (such as high performance military aircraft, helicopters, hovercraft and the like), there may be one relatively large redundancy system that may include, for example, a first nominal primary computer, second and third back-up computers, and a fourth computer that monitors the first three and "votes" or selects the best of the first three (based on performance data) as the primary and one of the remaining two as the secondary. Such systems are highly software-dependent and, on occasion, the computer makes the wrong decision. In addition, if an actuator in the system fails, it cannot be fixed but only replaced in the event one or more redundant actuators are incorporated into the system.

Recent advances in computers, sensors and other technologies have made possible reliance on unmanned air vehicles (UAVs) where no human pilot is present on board. In these vehicles, the pilot operated controlled input sensors that generate electrical command control inputs to a computer control system are not used. However such electrical command control inputs are still necessary for commanding the vehicle and are either commanded from the ground through a wireless communication link or by a computerized on-board system, sometimes termed mission-control-computer or mission-control-system, or both. The needs of UAVs in terms of reliability and redundancy are not materially different from those described earlier for manned systems and therefore the advantages of the FCS described herein are also applicable to UAVs.

In another FCS developed by Boeing for use with a fixed-wing aircraft (see U.S. Pat. No. 4,598,890) a multi-data bus or multi-channel redundancy FBW system features complete channel separation with no automatic switching of data or control information between the channels for a given aircraft control surface (e.g., the elevator). The system as described was supposed to briefly sustain a failure of any one segment of a multi-segmented control surface, e.g., the elevator control surfaces (on the aircraft horizontal stabilizer) which are physically split apart into four independently movable segments while it was being returned in a failsafe manner to a neutralized position. This prior system also used a visual feedback system to the pilot and contemplated a manual pilot input to de-activate and neutralize any malfunctioning one of the control segments.

Many different types of VTOL vehicles have been proposed where the weight of the vehicle in hover is carried directly by vertical air flow generated by rotating fans, propellers, turbojets, etc. with the axis of rotation generally perpendicular to the ground. One well known vehicle of this type is the conventional helicopter which includes large rotor blades mounted above the vehicle fuselage. Other types of VTOL vehicles have used propellers installed inside circular cavities, shrouds, ducts or other types of nacelle (generically referred to herein as a duct or ducts), where the propeller or rotor blades are not exposed, and where the flow of air is generated inside the duct. Most such ducts have uniform circular cross-sections with the exit area (usually at the bottom of the duct when the vehicle is hovering) being similar to that of the inlet area (usually at the top of the duct). Some ducts, however, have other cross-sections and some are slightly divergent, having an exit area that is larger than the inlet area, as this was found to increase efficiency and reduce the power required per unit of lift for a given inlet diameter. Some ducts have a wide inlet lip in order to augment the thrust obtained, especially in hover.

Other types of VTOL vehicles have used a multitude of smaller rotors or propellers, usually two or sometimes four, mounted at the tip of a wing or tandem wings, and having the ability to be oriented vertically for obtaining VTOL and then the ability to be tilted forward in a manner similar to fixed wing aircraft for providing thrust while the wing(s) provide(s) lift. These vehicles are often termed "tilt-rotor". Some of these VTOL vehicles have used circular ducts surrounding the rotors or propellers to achieve the previously mentioned advantages possible with a duct, while retaining the tilting capability of the "tilt-rotor". Such vehicles are often termed "tilt-duct".

VTOL vehicles are usually more challenging than fixed wing aircraft in terms of stability and control—and hence the need for more effective, reliable and safe FCSs. One difficulty rises from the fact that, contrary to fixed wing aircraft which accelerate on the ground until enough airspeed is achieved to develop minimum relative air velocity on their flight surfaces for well controlled flight, VTOL vehicles may sometimes hover with little or zero movement relative to the ground and/or air masses of the surrounding ambient air. For these vehicles, the control system typically utilizes, for example, the pitch and/or rotational speed of the rotors or propellers or the flow of air that they produce to create control forces and moments around the vehicle's center of gravity (CG) so as to controllably direct the effective thrust centerline created by the rotor or propeller.

One method, which is very common in helicopters, is to mechanically change, by command from the pilot, the pitch of the rotating rotor blades both collectively and cyclically, and to modify the main thrust as well as moments and/or inclination of the propeller's thrust line that the propeller or rotor exerts on the vehicle. Some VTOL vehicles using ducted or other propellers that are mounted inside the vehicle also employ this method of control. Some designers choose to change only the angle of all the rotor blades using ducted or other propellers mounted inside the vehicle for this method of control. The angle of all the rotor blades may be changed collectively (termed collective control) to avoid the added complexity of changing the angle of each blade individually (termed cyclic control). On vehicles using multiple fans or rotor blades which are relatively far from the CG, different collective control settings can be used on each fan or rotor blade to produce the desired control moments.

The disadvantage of using collective controls, and especially cyclic controls, lies in their added complexity, weight and cost. Therefore, a simple thrust unit that is also able to generate moments and side forces, while still retaining a simple rotor not needing cyclic blade pitch angle changes, has an advantage over the more complex solution. The main problem is usually the creation of rotational moments of sufficient magnitude required for control.

One traditional way of creating moments on ducted fans is to mount a discrete number of directional force control vanes only at or slightly below the exit section of the duct. These vanes, which are immersed in the flow exiting the duct, can be deflected to create a side force. Since the vehicle's center of gravity is in most cases at a distance above these vanes, the side force on the vanes also creates a moment around the vehicle's CG.

However, one problem associated with vanes mounted only at the exit of the duct in the usual arrangement as described above, is that even if these are able to create some force or moment in the desired direction, they cannot do so without creating at the same time a significant further side force or moment that has an unwanted secondary effect on the vehicle. For such vanes mounted only below the vehicle's CG (which is the predominant case in practical VTOL vehicles), these side forces cause the vehicle to accelerate in directions which are usually counter-productive to the result desired (e.g., through the generation of undesired additional forces and/or moments by the same vanes), thereby limiting their usefulness on such vehicles.

The prior Chrysler VZ-6 VTOL flying car used vanes on the exit side of the duct, together with a small number of very large wings mounted outside and above the duct inlet area. However, in the VZ-6, the single wing and the discrete vanes were used solely for the purpose of creating a steady, constant forward propulsive force, and not for creating varying control moments as part of the stability and control system of the vehicle.

The prior Hornet unmanned vehicle developed by AD&D, also experimented with using either a single, movable large wing mounted outside and above the inlet, or, alternatively using a small number of vanes close to the inlet side. However these were fixed in angle and could not be moved in flight for control purposes.

Another case that is sometimes seen is that of vanes installed radially from the center of the duct outwards, for the purpose of creating yawing moments (around the propeller's axis).

BRIEF SUMMARY

An exemplary aircraft FCS is described below having plural control subsystems with redundancies organized so as to provide continued but degraded control power over critical aircraft flight operating parameters even if any one complete control subsystem catastrophically fails.

One type of exemplary FCS for a VTOL craft that includes at least a pair of ducted lift fans, each having a plurality of adjustable directional vanes associated therewith (e.g., at the inlet side) has a plurality of independent groups of controls collectively supplying 100% of required control power for the FCS and the ability to continue providing at least 50% of the required control power upon failure of any one of the independent groups. The VTOL craft may be configured so as to have n groups of controls, each group independent of all remaining groups and controlling adjustment of 1/n of the plurality of adjustable directional vanes. Each group may have its own dedicated control computer subsystem such that failure of any m group(s) still leaves at least $n-m/n$ of the maximum control power available for controlling the directional vanes of the remaining groups.

An exemplary flight control system is described below for VTOL vehicles (which may have relaxed stability aspects) that incorporate a ducted fan propulsion system producing rotary moments and side forces for control purposes. The exemplary flight control system is preferably designed in a manner that it will ensure the safety of the vehicle in event of a malfunction in any one of its channels or control groups and enable the flight at least to descend to a safe landing. In this regard, the exemplary flight control systems disclosed herein break with the conventional practice of providing stand-by back-up systems where failed systems or subsystems are "replaced," or in some cases re-pressurized from a back-up hydraulic system or the like so as to maintain 100% control power even if there is a failed subsystem.

More specifically, one exemplary control system disclosed herein divides the overall system into plural (four, for example) independent control groups each group containing appropriately selected sensors, computers, actuators and control surfaces (which may include directional vanes and variable pitch rotor/propeller blades). Note that each group contributes substantially (e.g., equally) to all movements of the craft. Thus, each group (using four as the number of groups in this example) contributes a substantial proportion (e.g., 25%) of the control power required to control the craft. This means that, with respect to, for example, a total of 400 directional control vanes, each group could control a selected set of 100 vanes. In the exemplary system described herein, the available control power (e.g., maximum possible control element movement) may be as much as 2x (or 200%) the required control power. As a result, if one group fails, there is more than sufficient control power remaining to, in a worst case scenario, effectively neutralize and counteract erroneous vane movement in a direction opposite the intended direction (e.g., a complete "upset" condition) via a second group, and to still controllably fly the craft through at least a controlled descent and landing with the remaining two groups. In other words, none of the control elements in the failed group need be replaced. Rather, the craft is able to be controlled (albeit in a probably degraded manner) via the (e.g., three) remaining groups, since each group contains control elements (sensors, computers, actuators and control surfaces) for controlling vehicle movement in each of six degrees of freedom of the vehicle, as determined by vane adjustment and/or blade pitch and/or prime mover speed control, etc. for both the main lift fan propellers and the pusher or thrust propellers. In some instances, blade pitch adjustment may be controlled by just two groups such that each group controls ¼ of the directional vane adjustments and/or two of the groups may each control ½ of the blade pitch adjustments.

With this arrangement of individual, independent control groups, each contributing substantially (e.g., equally) to the required control power, it has been discovered that there is no need for alternative stand-by systems or "voting" as between available primary and back-up computers.

This arrangement also provides design flexibility in the selection of sensors and actuators. In other words, because the groups of controls are independent of each other, different brand of sensors or actuators may be used in the respective groups, thus improving the overall reliability of the system, but also providing a platform for an extended comparison between different brands or different types of sensors/actuators. For example, use of dissimilar components in different of the redundant subsystems may help avoid adverse reliability issues otherwise encountered by using only the same or similar components in each redundant subsystem.

BRIEF DESCRIPTION OF THE DRAWINGS

The invention is herein described, by way of example only, with reference to the accompanying drawings, wherein:

FIGS. 31a-31e are a pictorial illustration of an alternative exemplary vehicle arrangement wherein the vehicle is relatively small in size, having the pilot's cockpit installed to one side of the vehicle. Various alternative payload possibilities are shown.

FIG. 35 is a table summarizing control and effect in various flight modes, operative in accordance with an exemplary embodiment of the present invention.

DETAILED DESCRIPTION OF THE DRAWINGS

Figure 1:
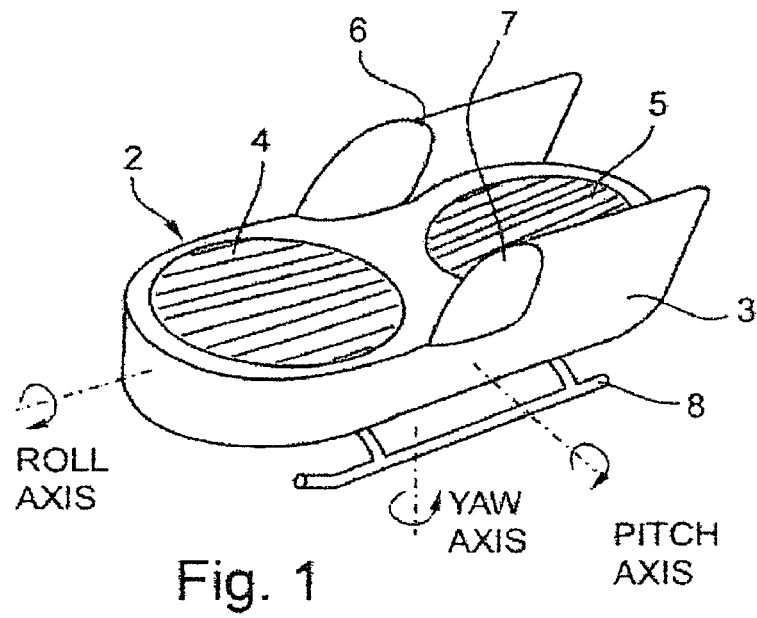
FIG. 1 illustrates one possible exemplary form of VTOL aircraft vehicle useful in understanding the present disclosure.

The vehicle illustrated in FIG. 1, and therein generally designated 2, is a VTOL vehicle including a frame or fuselage 3 carrying a ducted lift fan propulsion unit 4 at the front, and another similar propulsion unit 5 at the rear. The vehicle payload is shown at 6 and 7, respectively, on opposite sides of the fuselage, and the landing gear is shown at 8. The roll, yaw and pitch axes are also indicated in the figure.

Figure 2:
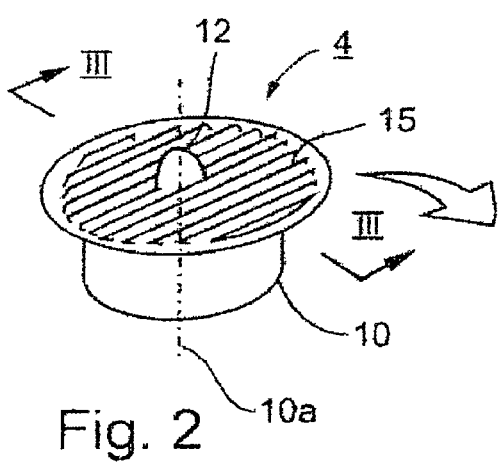
FIG. 2 illustrates one of the ducted fans removed from the aircraft of FIG. 1, with vanes at the inlet end of the duct.
Figure 3:
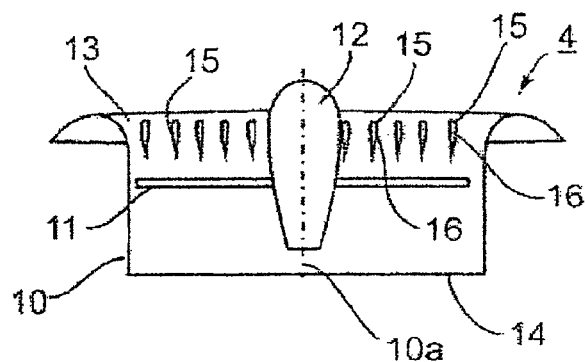
FIG. 3 is a sectional view along line III-III of FIG. 2.

FIGS. 2 and 3 more particularly illustrate the structure of the ducted lift fan propulsion unit 4, which is the same as propulsion unit 5. Such a propulsion unit includes a duct 10 carried by the fuselage 3 with the vertical axis 10a of the duct parallel to the vertical axis of the vehicle. Propeller 11 (FIG. 3) is rotatably mounted within the duct 10 about the longitudinal axis 10a of the duct. The propeller 11 may be driven by any suitable prime mover, e.g., an electric motor, combustion engine (e.g., a jet engine) or the like. Nose 12 of the propeller faces upwardly, so that the upper end 13 of the duct constitutes the air inlet end, and the lower end 14 of the duct constitutes the exit end. As shown particularly in FIG. 3, the upper air inlet end 13 is formed with a funnel-shaped mouth to produce a smooth inflow of air into the duct 10, which air is discharged at high velocity through the exit end 14 of the duct for creating an upward lift force.

Figure 4:
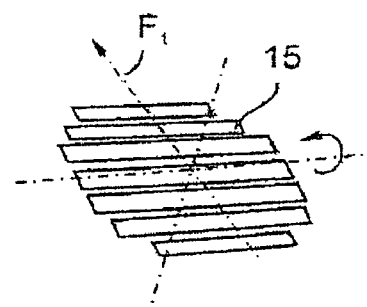
FIG. 4 is a diagram illustrating the positioning of the vanes of FIG. 3 in one direction to produce a lateral force in one direction.
Figure 5:
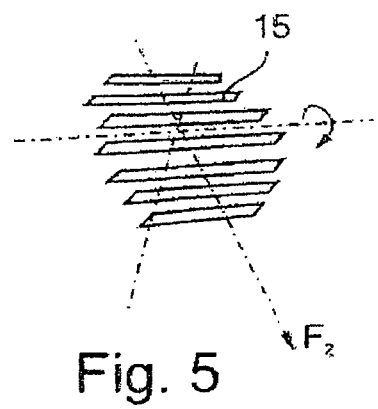
FIG. 5 is a diagram illustrating the positioning of the vanes of FIG. 3 to produce a lateral force in the opposite direction.

To provide directional control, the duct 10 is provided with a plurality of parallel, spaced directional vanes 15 pivotally mounted across the inlet end 13 of the duct. It will be appreciated that the vanes may be supported by any suitable arrangement that locates the vanes at the inlet 13 of the duct 10. Each of the vanes 15 is pivotal about an axis 16 perpendicular to the longitudinal axis 10a of the duct 10 and substantially parallel to the longitudinal axis of the vehicle frame 2, to produce a desired horizontal control force in addition to the lift force applied to the vehicle by the movement of air produced by the propeller 11. Thus, as shown in FIG. 4, if the vanes 15 are pivoted in one direction about their respective axes, they produce a desired control force in the direction of the arrow F1 in FIG. 4; and if they are pivoted in the opposite direction, they produce a desired control force in the direction of the arrow F2 in FIG. 5. As shown in FIG. 3 (also FIGS. 7, 8, 12), the vanes 15 are preferably of a symmetric airfoil shape and are spaced from each other a distance approximately equal to the chord length of the vanes.

Figure 6:
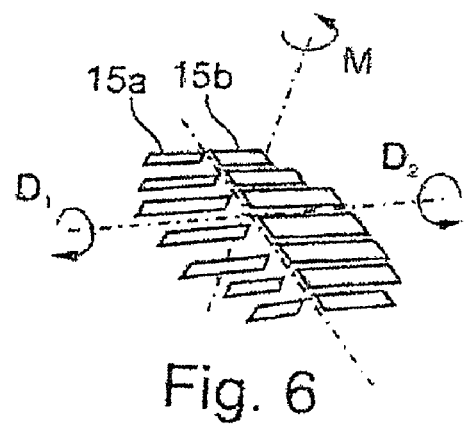
FIG. 6 illustrates an exemplary modification in the construction of the vanes wherein each of the vanes is split into two halves, each half of all the vanes being separately pivotal from the other half of all the vanes to produce a rotary moment force about the duct longitudinal axis.

FIG. 6 illustrates a variation wherein each of the vanes 15, instead of being pivotally mounted as a unit for its complete length to produce the desired side control force, is split into two half-sections, as shown at 15a and 15b in FIG. 6, with each half-section separately pivotal from the other half-section. Thus, all the half-sections 15a may be pivoted as a unit in one direction as shown by arrow $D_1$, and all the half-sections 15b may be pivoted in the opposite direction as shown by arrow $D_2$, to thereby produce any desired side force or rotary moment in addition to the lift force applied to the vehicle by the propeller.

Figure 7:
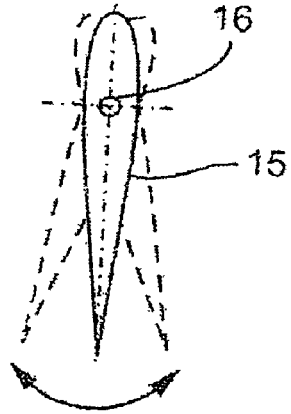
FIG. 7 is a diagram illustrating the construction of one of the vanes and the manner for pivoting it.
Figure 8:
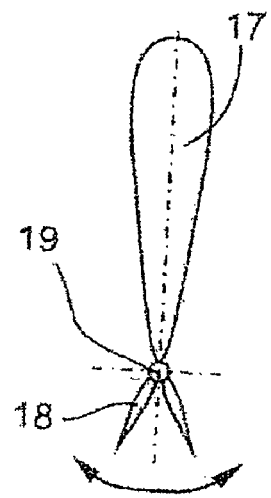
FIG. 8 illustrates an alternative exemplary construction of one of the vanes and the manner for pivoting it.

As shown in FIG. 7, each of the vanes 15 is pivotally mounted about axis 16 passing through a mid portion of the vane. FIG. 8 illustrates a modification wherein each vane includes a fixed section 17, which constitutes the main part of the vane, and a pivotal section or flap 18 pivotally mounted at 19 to the trailing side of the fixed section. It will thus be seen that the pivotal section or flap 18 may be pivoted to any desired position in order to produce a desired control force in addition to the lift.

Figure 9:
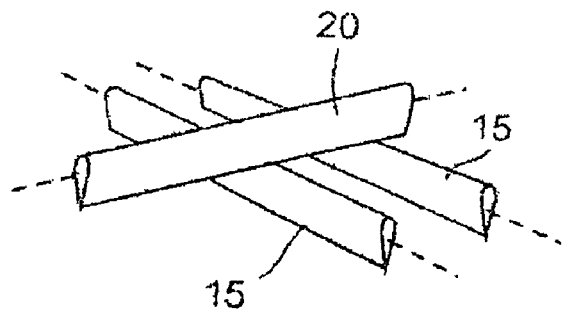
FIG. 9 illustrates one exemplary arrangement that may be used for providing two cascades or assemblies of vanes at the inlet end of the duct of FIG. 9.

FIG. 9 illustrates a variation wherein the ducted lift fan (4 and/or 5 FIG. 1) includes a second plurality or cascade of parallel, spaced vanes, one of which is shown at 20, pivotally mounted across the inlet end 13 of the duct 10. Thus, each of the vanes 20 of the second plurality is closely spaced to the vanes 15 and is pivotal about an axis perpendicular to the pivotal axis of the vanes 15, as well as to the longitudinal axis 10a of the duct.

Figure 10:
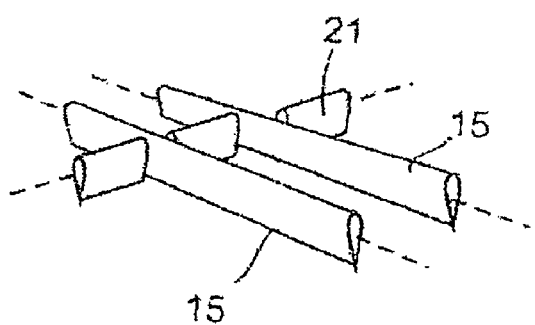
FIG. 10 illustrates another exemplary arrangement that may be used for providing two cascades or assemblies of vanes at the inlet end of the duct.

In the variation illustrated in FIG. 9, the two cascades of vanes 15, 20, are arranged in parallel, spaced planes. FIG. 10 illustrates a variation wherein the two cascades of vanes at the inlet end of the duct are intermeshed. For this purpose, each of the vanes 21 of the second plurality would be interrupted so as to accommodate the crossing vanes 15 of the first plurality, as shown in FIG. 10. Another possible arrangement would be to have the vanes of both cascades interrupted for purposes of intermeshing.

Figure 11:
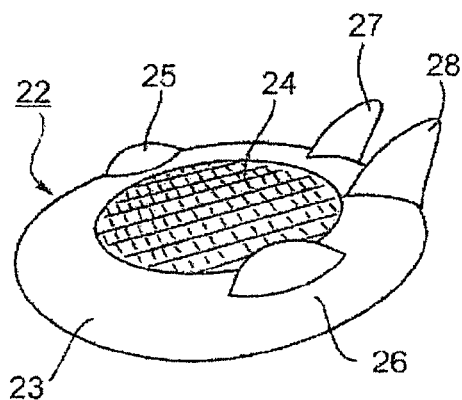
FIG. 11 illustrates an exemplary VTOL aircraft vehicle including a single ducted fan for propulsion and control purposes.

FIG. 11 illustrates a VTOL vehicle 22 including a single ducted fan 24 carried centrally of its fuselage 23. Such a vehicle could include the arrangement of vanes illustrated in either FIG. 9 or FIG. 10 to provide the desired control forces and moments in addition to the lift forces. In such a vehicle, the payload may be on opposite sides of the central ducted fan 24, as shown at 25 and 26 in FIG. 11. The vehicle may also include other aerodynamic surfaces, such as rudders 27, 28 to provide steering and other controls.

Figure 12:
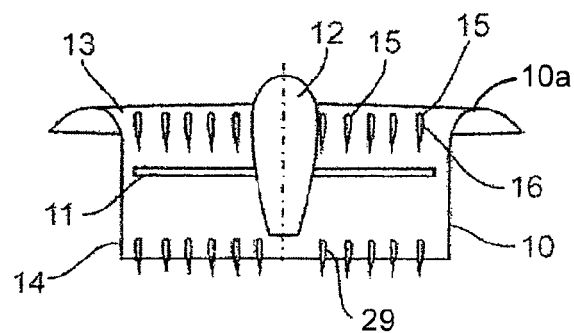
FIG. 12 is a view similar to that of FIG. 3 but illustrating the provision of a cascade or plurality of vanes also at the exit end of the duct.

FIG. 12 illustrates a further embodiment that may be included in either of the vehicles of FIGS. 1 and 11 wherein the duct 10 also has a second plurality. or cascade of parallel, spaced directional vanes 29, but in this case, the second plurality are pivotally mounted across the exit end 14 of the duct 10. Thus, as shown in FIG. 12, the duct 10 includes the first plurality or cascade of vanes 15 extending across the inlet end 13 of the duct, and a second plurality or cascade of vanes 29 extending across the exit end 14 of the duct 10, also perpendicular to the longitudinal axis of the duct and substantially parallel to the longitudinal axis of the vehicle frame. Each assembly or cascade 15, 29 of the vanes may be pivoted independently of the other to produce selected side forces or rotary moments about the duct's transverse axis 10b for pitch or roll control of the vehicle.

Figure 13A:
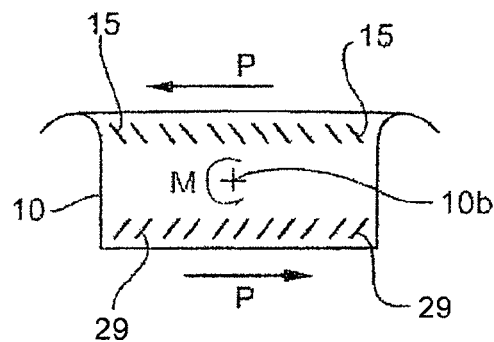
FIGS. 13a-13d illustrate various pivotal positions of the two cascades of vanes in the ducted fan of FIG. 12, and the forces produced by each such positioning of the vanes.
Figure 13B:
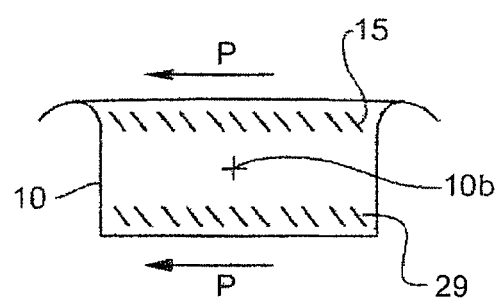
Figure 13C:
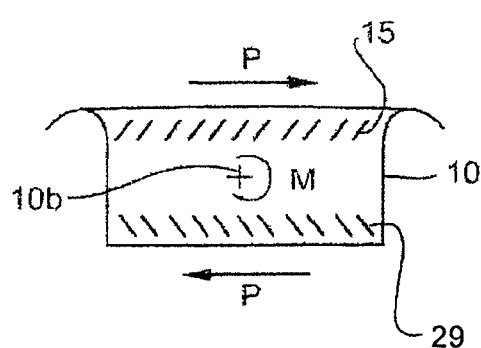
Figure 13D:
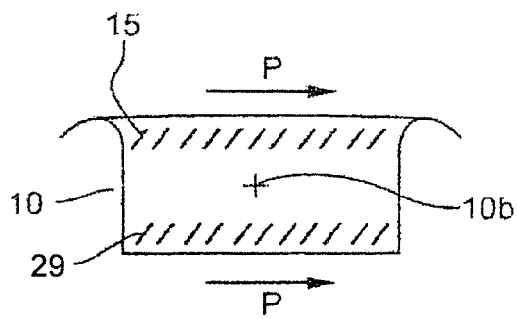

This is more clearly shown in the diagrams of FIGS. 13a-13d. Thus, when the two cascades of vanes 15, 29, are pivoted in opposite directions, they produce a rotary moment about the transverse axis 10b of the duct 10 in one direction (e.g., counter-clockwise as shown in FIG. 13a); when they are pivoted in the same direction, they produce a side force in one direction (e.g. left) as shown in FIG. 13b when pivoted in opposite directions but opposite to the arrangement shown in FIG. 13a, they produce a rotary moment in the opposite clockwise direction as shown in FIG. 13c; and when they are pivoted in the same direction but opposite to that shown in FIG. 13b, they produce a side force in the opposite (e.g. right) direction, as shown in FIG. 13d.

Figure 14:
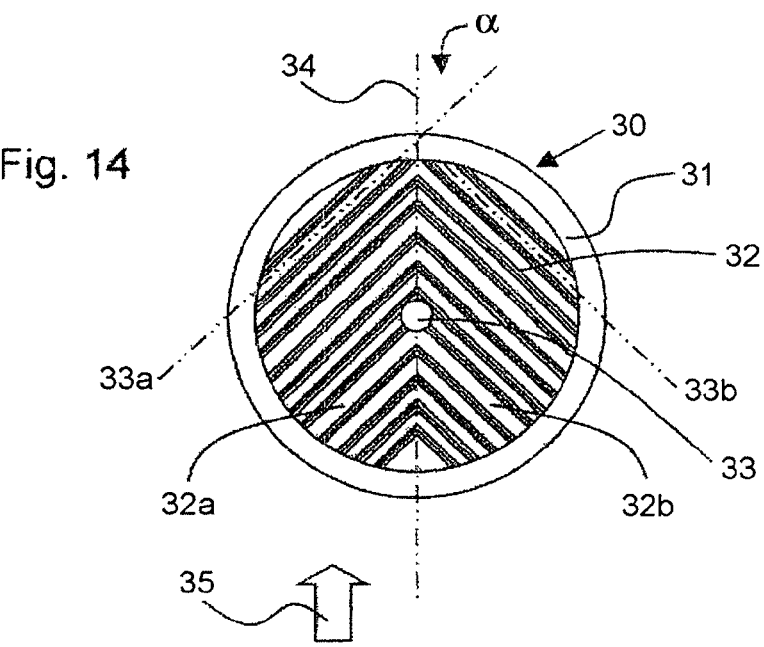
FIG. 14 is a top view diagrammatically illustrating another construction wherein the vanes extending across the inlet of the duct are divided into two groups together producing the desired net horizontal control force.

FIG. 14 is a top view illustrating another construction of ducted fan propulsion unit, generally designated 30, including a duct 31 having a plurality of vanes 32 extending across the inlet end of the duct. In this case, the vanes 32 are divided into a first group of parallel vanes 32a extending across one-half the inlet end of the duct 31, and a second group of parallel vanes 32b extending across the remaining half of the inlet end of the duct.

FIG. 14 also illustrates the nose 33 of the propeller within the duct 31. The propeller is mounted within the duct 31 for rotation about the longitudinal axis of the duct, with the nose 33 of the propeller hub centrally located at the air inlet end of the duct such that the air discharged at a high velocity through the opposite end of the duct creates an upward lift force.

As shown in FIG. 14, the first group of parallel vanes 32a extending across one half of the inlet end of the duct 31 are pivotal about axes 33a at a predetermined acute angle a with respect to the longitudinal axis 34 of the vehicle frame and thereby of the direction of movement of the vehicle as shown by arrow 35; and that the second group of parallel vanes extending across the remaining half of the inlet end of the duct are pivotal about axes 33b at the same predetermined angle α, but in the opposite direction, with respect to the longitudinal axis 34 of the vehicle frame. The two groups of vanes 32a, 32b are selectively pivotal to produce a desired net horizontal control force in addition to the lift force applied to the vehicle.

Figure 15A:
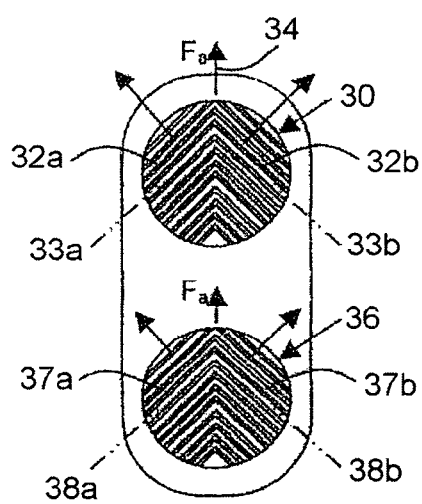
FIGS. 15a and 15b diagrammatically illustrate the manner in which the desired net horizontal control force is produced by the vanes of FIG. 14.
Figure 15B:
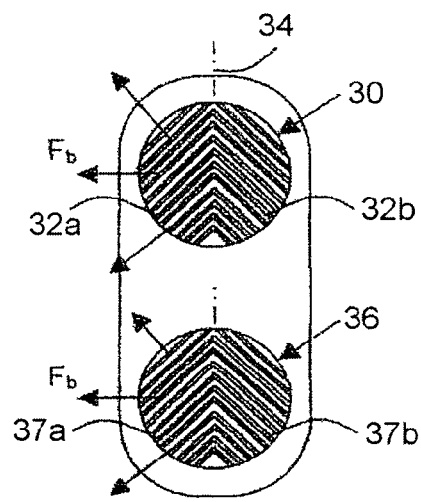

The foregoing operations are illustrated in the diagrams of FIGS. 15a and 15b. Both FIGS. 15a and 15b illustrate the control forces generated when the vehicle includes two ducted fan propulsion units 30, 36, at the opposite ends of the vehicle and coaxial with the vehicle longitudinal axis 34. It will be appreciated that comparable forces are produced when the vehicle is equipped with only one ducted fan propulsion unit shown in FIG. 14.

FIG. 15a illustrates the condition wherein the two groups of vanes 32a, 32b are pivoted to equal angles about their respective axes 33a, 33b. The vanes thus produce, in addition to the lift force, control forces of equal magnitude and angles on opposite sides of the vehicle longitudinal axis 34, so as to produce a net force, shown at Fa, coaxial with the vehicle longitudinal axis 34.

The two groups of vanes 37a, 37b of the rear propulsion unit 36 are pivotal in the same manner about their respective pivotal axes 38a, 38b, and thereby produce a net force Fa also coaxial with the vehicle longitudinal axis 34.

FIG. 15b illustrates a condition wherein the two groups of vanes 32a, 32b in the fore propulsion unit 30, and the two groups of vanes 37a, 37b in the aft propulsion unit 36, are pivoted about their respective axes to unequal angles, thereby producing net side forces Fb at an angle to the vehicle longitudinal axis 34. Thus, by controlling the pivot angles of the vanes 32a, 32b and 37a, 37b about their respective pivotal axes, a net control force may be generated as desired in the plane of the vanes.

Figure 16:
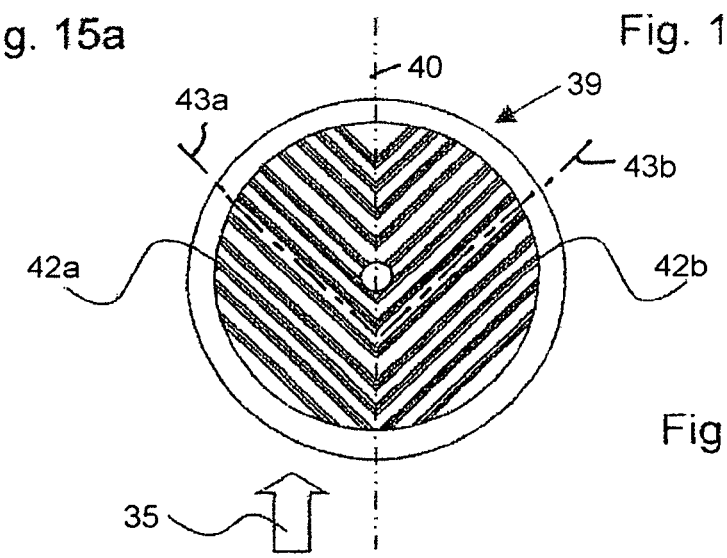
FIG. 16 is a view corresponding to that of FIG. 14 but illustrating a variation in the vane arrangement for producing the desired net horizontal control force.

FIG. 16 illustrates a ducted fan propulsion unit 39 in relation to a vehicle axis 40 also including two groups of vanes 42a, 42b each extending across one-half of the inlet of the duct 39 and pivotally mounted about respective axes 43a, 43b at a predetermined angle, (e.g., 45°) to the longitudinal axis 40 of the vehicle. In this case, however, the vanes 42a, 42b are oriented in the forward direction, rather than in the aft direction as in FIG. 14, but the operation, and the forces generated by the vanes, are basically the same as described above with respect to FIGS. 14, 15a, 15b.

It will be appreciated that any of the foregoing arrangements may be used in any of the above-described vehicles to produce the desired (directional) control forces in addition to the lift forces. The vanes are not intended to block air flow, but merely to deflect air flow to produce the desired control forces. Accordingly, in most applications the vanes would be designed to pivot no more than 15° in either direction, which is the typical maximum angle attainable before flow separation.

Since the control forces and moments are generated by horizontal components of the lift forces on the vanes themselves, the vanes should preferably be placed on the intake side of the propeller as far from the center of gravity of the vehicle as possible for creating the largest attainable moments. As shown in FIG. 12, for example, vanes 15 are located immediately adjacent and slightly below the lip 10a of the duct 10. The leading edge of the vanes 15 could be flush or substantially flush with the lip 15 but preferably not above the lip. If the vanes are located more deeply within the duct 10, the lifting force created by the vanes may be partially cancelled by reactions with the surrounding duct wall. On the other hand, the low pressure at the lip where the air flow turns to enter the duct may create an additional 20-30% lift as compared to less optimal locations. The same applies if vanes are provided on the exit side of the ducts.

Figure 17:
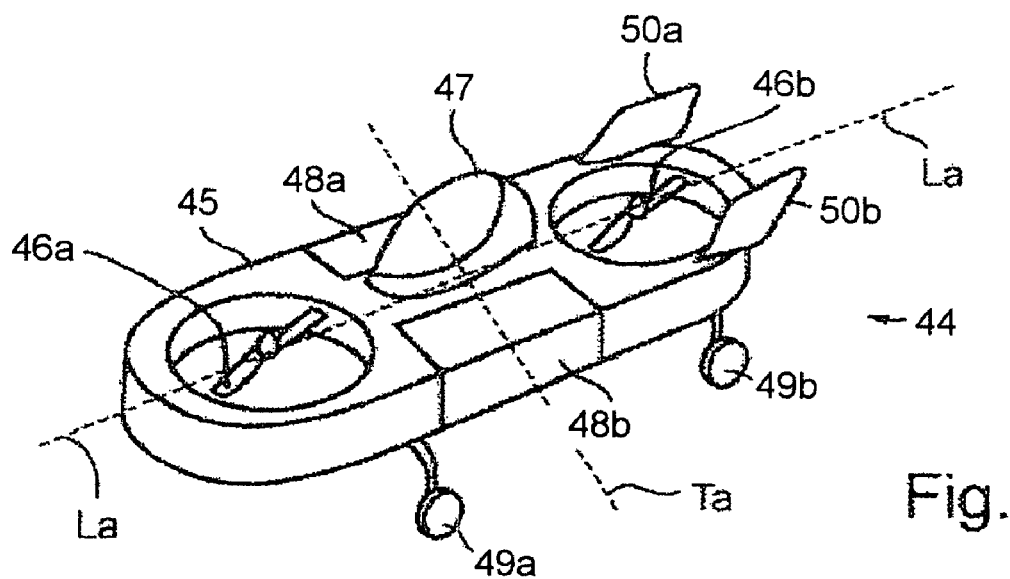
FIG. 17 illustrates an exemplary VTOL vehicle with two ducted fans useful in understanding the present disclosure.

FIG. 17 illustrates an alternative vehicle construction generally designated 44 that includes a fuselage 45 having a longitudinal axis LA and a transverse axis TA. Vehicle 44 further includes two lift-producing propellers 46a, 46b carried at the opposite ends of the fuselage 45 along its longitudinal axis LA and on opposite sides of its transverse axis TA. Lift-producing propellers 46a, 46b are ducted fan propulsion units extending vertically through the fuselage and rotatable about vertical axes to propel the air downwardly and thereby to produce an upward lift.

Vehicle 44 further includes a pilot's compartment 47 formed in the fuselage 45 between the lift-producing propellers 46a, 46b and substantially aligned with the longitudinal axis LA and transverse axis TA of the fuselage. The pilot's compartment 47 may be dimensioned so as to accommodate a single pilot or two (or more) pilots, as shown, for example, in FIG. 22a.

Vehicle 44 illustrated in FIG. 17 further includes a pair of payload bays 48a, 48b formed in the fuselage 45 laterally on opposite sides of the pilot's compartment 47 and between lift-producing propellers 46a, 46b. The payload bays 48a, 48b shown in FIG. 17 are substantially flush with fuselage 45, as will be described more particularly below with respect to FIGS. 22a-22c and the pictorial illustration in FIGS. 25a-25d. Also described below, particularly with respect to the pictorial illustrations of FIGS. 25a-25d, are the wide variety of tasks and missions capable of being accomplished by the vehicle when constructed as illustrated in FIG. 17 (and in the later illustrations), and particularly when provided with the payload bays corresponding to 48a, 48b of FIG. 17.

Vehicle 44 illustrated in FIG. 17 further includes a front landing gear 49a and a rear landing gear 49b mounted at the opposite ends of its fuselage 45. In FIG. 17, the landing gears are non-retractable, but could be retractable as in later described embodiments. Aerodynamic stabilizing surfaces may also be provided, if desired, as shown by the vertical stabilizers 50a, 50b carried at the rear end of fuselage 45 on the opposite sides of its longitudinal axis LA.

Figure 18:
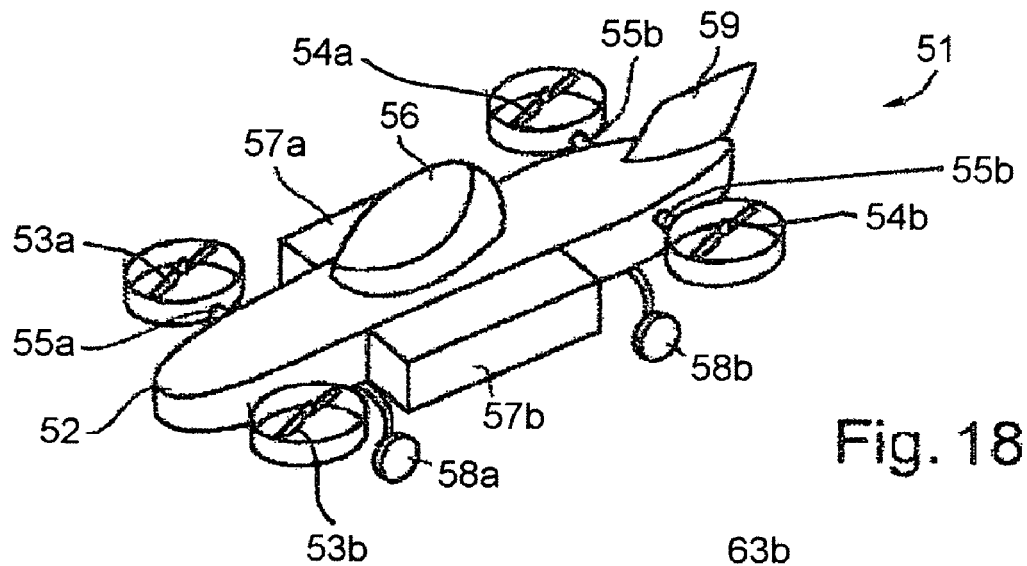
FIG. 18 illustrates an alternative exemplary construction with four ducted fans.

FIG. 18 illustrates another vehicle construction generally designated 51, where the fuselage 52 is provided with a pair of lift-producing propellers on each side of the transverse axis of the fuselage. Specifically, the vehicle includes a pair of lift-producing propellers 53a, 53b at the front end of the fuselage 52, and another pair of lift-producing propellers 54a, 54b the rear end of the fuselage. The lift-producing propellers 53a, 53b and 54a, 54b are also ducted fan propulsion units. However, instead of being formed in the fuselage 52, they are mounted on two pair of supports 55a (one shown), 55b projecting laterally of the fuselage.

Vehicle 51 illustrated in FIG. 18 also includes the pilot's compartment 56 formed in the fuselage 52 between the two pairs of lift-producing propellers 53a, 53b and 54a, 54b, respectively. As in the case of the pilot's compartment 47 in FIG. 17, the pilot's compartment 56 in FIG. 18 is also substantially aligned with the longitudinal axis LA and transverse axis TA of the fuselage 52.

Vehicle 51 illustrated in FIG. 18 further includes a pair of payload bays 57a, 57b formed in the fuselage 52 laterally of the pilot's compartment 56 and between the two pairs of lift-producing propellers 53a, 53b, 54a, 54b. In FIG. 18, however, the payload bays are not formed integral with the fuselage, as in FIG. 17, but rather are attached to the fuselage so as to project laterally on opposite sides of the fuselage. Thus, payload bay 57a is substantially aligned with the lift-producing propellers 53a, 54a on one side of the fuselage, and payload bay 57b is substantially aligned with the lift-producing propellers 53b, 54b on the other side of the fuselage.

Vehicle 51 illustrated in FIG. 18 also includes a front landing gear 58a and a rear landing gear 58b, but only a single vertical stabilizer 59 at the rear end of the fuselage aligned with its longitudinal axis. It will be appreciated however, that vehicle 51 illustrated in FIG. 18 could also include a pair of vertical stabilizers, as shown at 50a and 50b in FIG. 17, or could be constructed without any such aerodynamic stabilizing surface.

Figure 19:
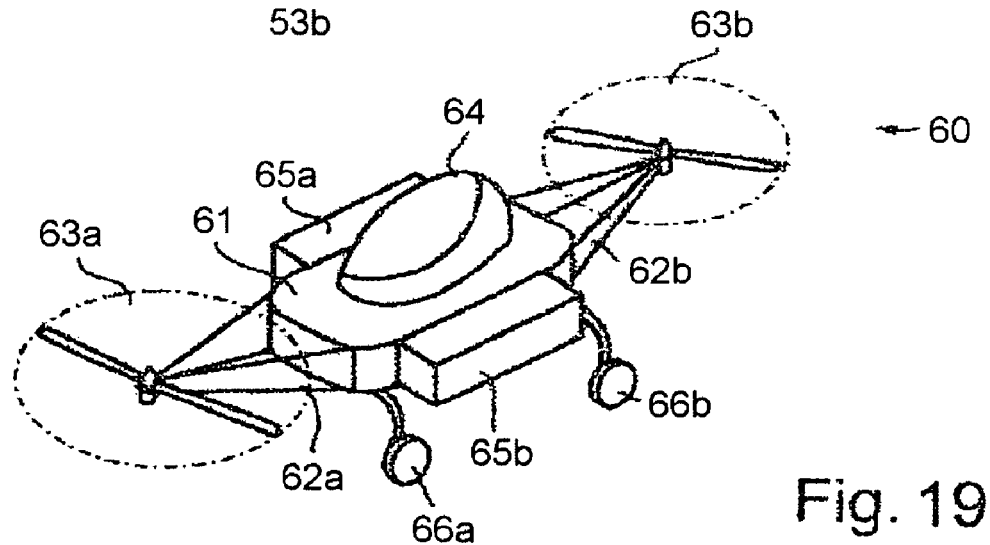
FIG. 19 illustrates an exemplary construction similar to FIG. 17 with free propellers, i.e., unducted fans.

FIG. 19 illustrates a vehicle 60 also including a fuselage 61 of a very simple construction having a forward mounting structure 62a for mounting the forward lift-producing propeller 63a, and a rear mounting structure 62b for mounting the rear lift-producing propeller 63b. Both propellers are unducted, i.e., free, propellers. Fuselage 61 is formed centrally thereof with a pilots compartment 64 and carries the two payload bays 65a, 65b on its opposite sides laterally of the pilot's compartment.

Vehicle 60 illustrated in FIG. 19 also includes a front landing gear 66a and a rear landing gear 66b, but for simplification purposes, it does not include an aerodynamic stabilizing surface corresponding to vertical stabilizers 50a, 50b in FIG. 17, or 59 in FIG. 18.

Figure 20:
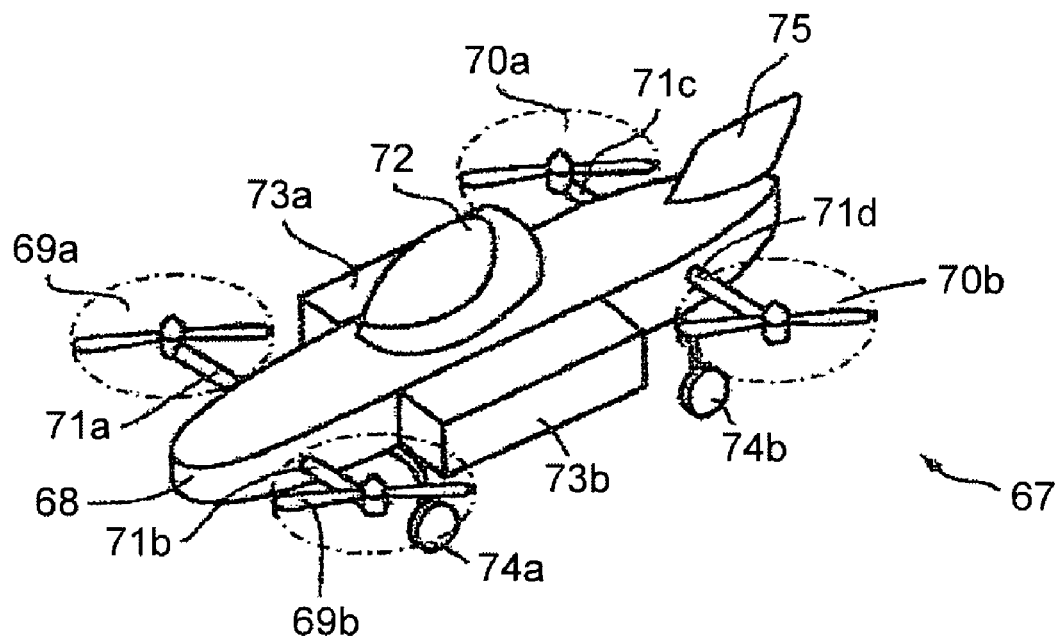
FIG. 20 illustrates an exemplary construction similar to FIG. 18 with free propellers.

FIG. 20 illustrates a vehicle 67 of a similar construction as in FIG. 18 but including a fuselage 68 mounting a pair of unducted propellers 69a, 69b at its front end, and a pair of unducted propellers 70a, 70b at its rear end by mounting structures 71a, 71b, 71c and 71d, respectively. Vehicle 67 further includes a pilot's compartment 72 centrally of the fuselage, a pair of payload bays 73a, 73b laterally of the pilot's compartment, a front landing gear 74a, a rear landing gear 74b, and a vertical stabilizer 75 at the rear end of the fuselage 68 in alignment with its longitudinal axis.

Figure 21:
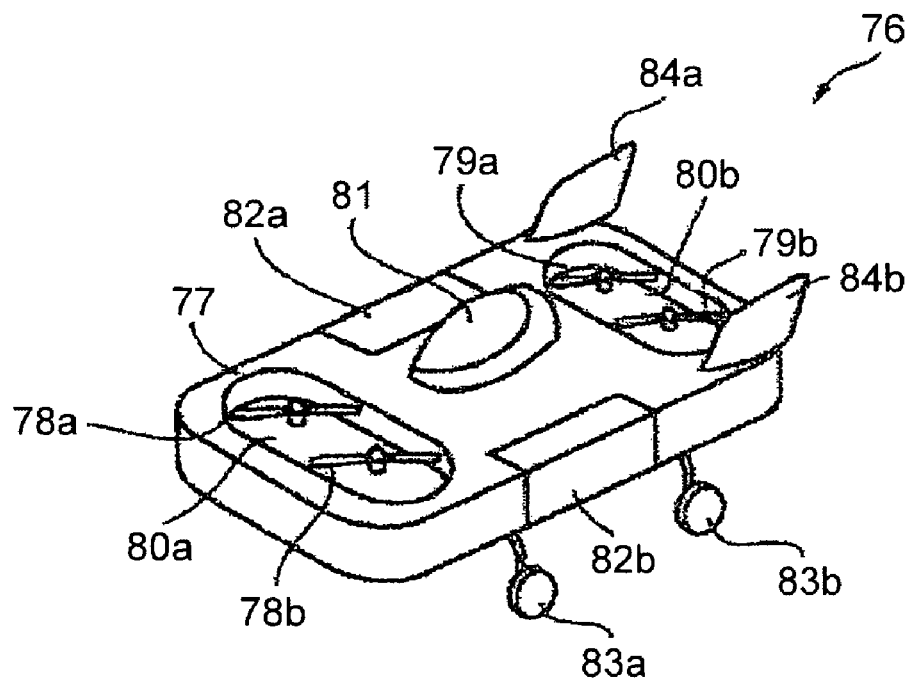
FIG. 21 illustrates an exemplary construction similar to that of FIG. 17 but including two propellers, instead of a single propeller, mounted side-by-side in a single, oval shaped duct at each end of the vehicle.

FIG. 21 illustrates a vehicle, generally designated 76, including a fuselage 77 mounting a pair of lift-producing propellers 78a, 78b at its front end, and another pair 79a, 79b at its rear end. Each pair of lift-producing propellers 78a, 78b and 79a, 79b is enclosed within a common oval-shaped duct 80a, 80b at the respective ends of the fuselage.

Vehicle 76 illustrated in FIG. 21 further includes a pilot'compartment 81 formed centrally of the fuselage 77, a pair of payload bays 82a, 82b laterally of the pilot's compartment 81, a front landing gear 83a, a rear landing gear 83b, and vertical stabilizers 84a, 84b carried at the rear end of the fuselage 77.

Figure 22A:
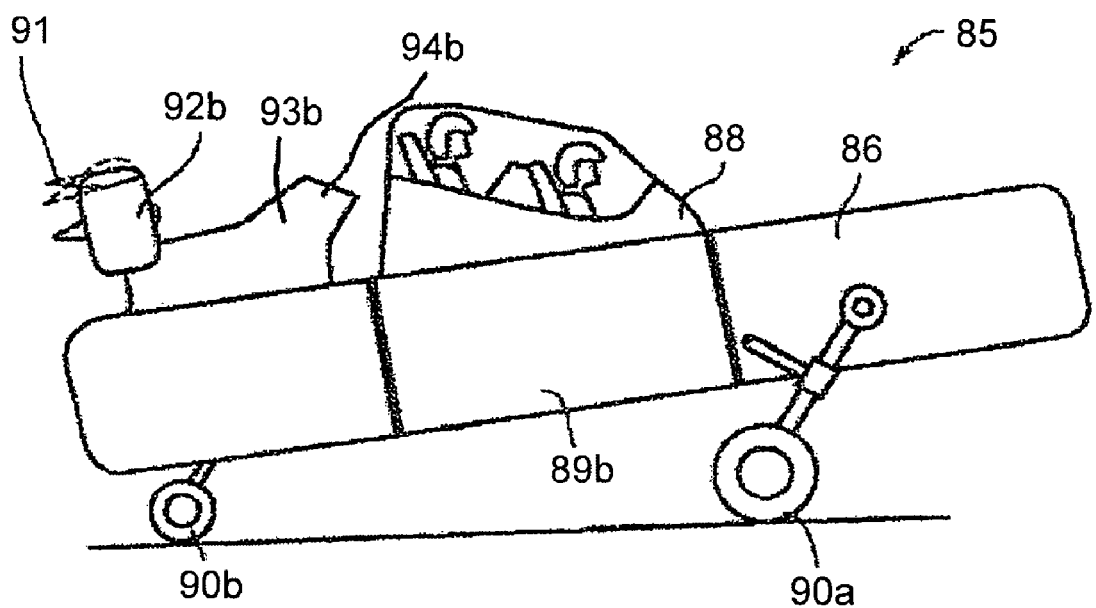
FIGS. 22a, 22b and 22c are side, top and rear views, respectively, illustrating another exemplary VTOL vehicle useful in understanding the present disclosure and including pusher propellers in addition to the lift-producing propellers.
Figure 22B:
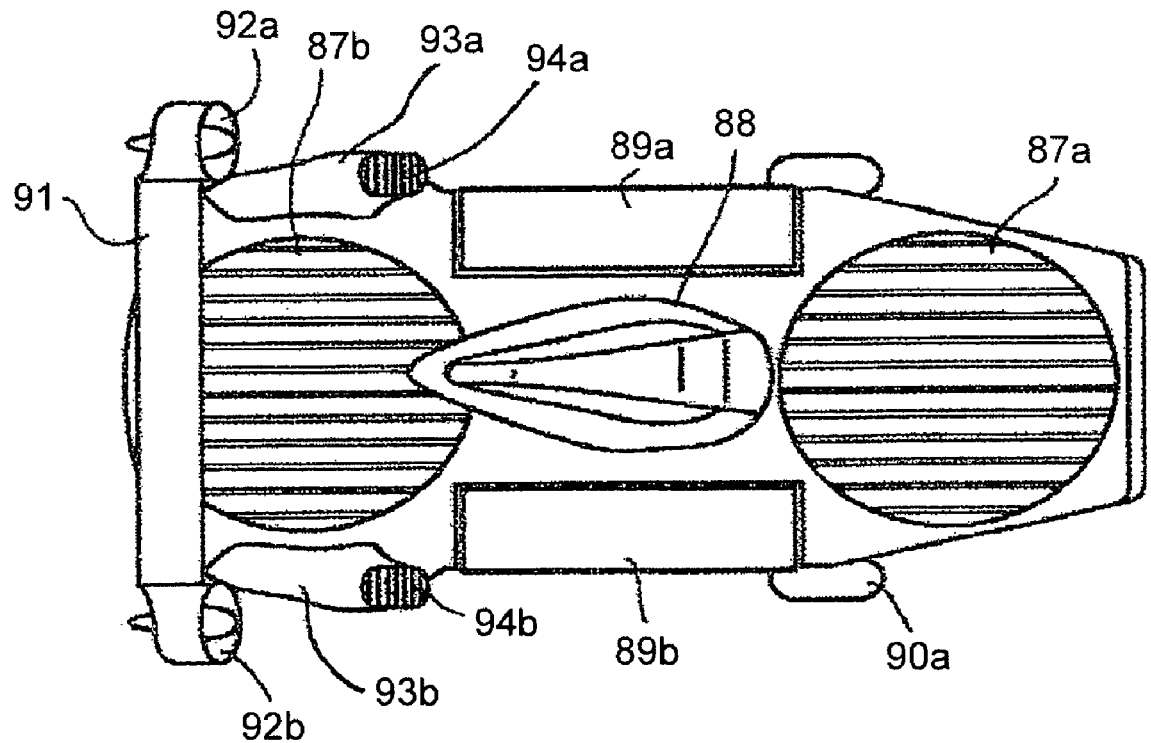
Figure 22C:
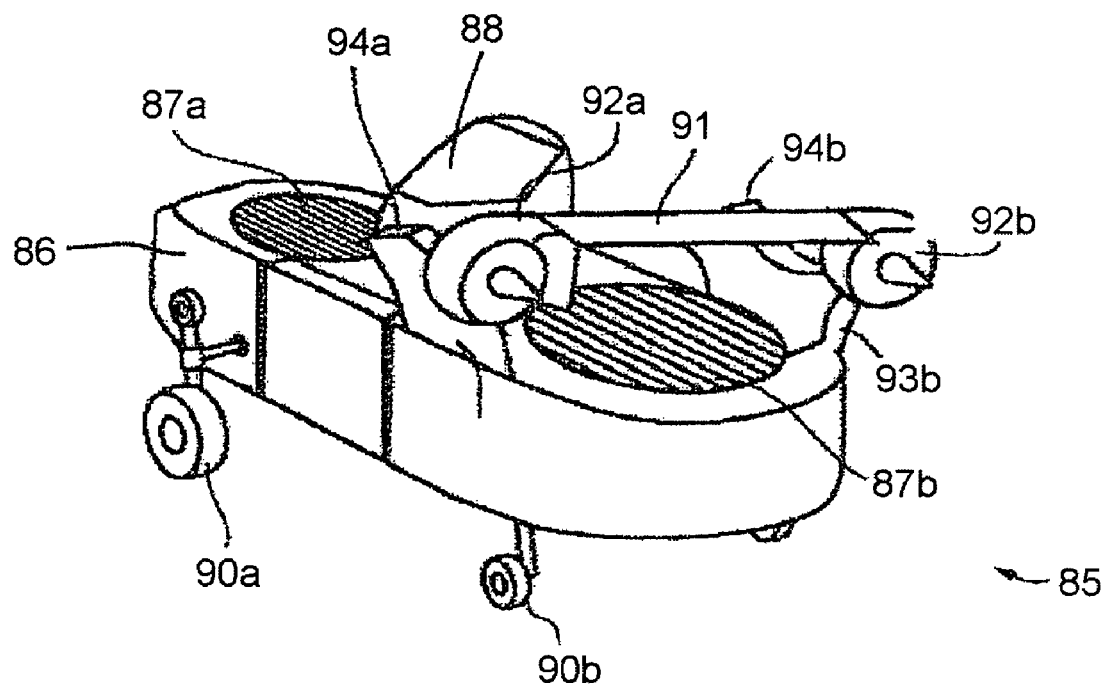

FIGS. 22a, 22b and 22c are side, top and rear views, respectively, of another vehicle constructed in accordance with the present invention. The vehicle, generally designated 85, also includes a fuselage 86 mounting a lift-producing propeller 87a, 87b at its front and rear ends, respectively. The latter propellers are preferably ducted fan units as in FIG. 17.

Vehicle 85 further includes a pilot's compartment 88 centrally of the fuselage 86, a pair of payload bays 89a, 89b laterally of the fuselage and of the pilot's compartment, a front landing gear 90a, a rear landing gear 90b, and a stabilizer, which, in this case, is a horizontal stabilizer 91 extending across the rear end of the fuselage 86.

Vehicle 85 illustrated in FIGS. 22a-22c further includes a pair of pusher propellers 92a, 92b, mounted at the rear end of the fuselage 86 at the opposite ends of the horizontal stabilizer 91. As shown particularly in FIG. 22c the rear end of the fuselage 86 is formed with a pair of pylons 93a, 93b, for mounting the two pusher propellers 92a, 92b, respectively, together with the horizontal stabilizer 91. The pusher propellers, or thrusters are required to attain the desired speed especially where the vanes of the ducted fan units all extend in a direction parallel to the longitudinal axis of the vehicle.

The two pusher propellers 92a, 92b are preferably variable-pitch propellers enabling the vehicle to attain higher horizontal speeds. The horizontal stabilizer 91 is used to trim the vehicle's pitching moment caused by the ducted fans 87a, 87b, thereby enabling the vehicle to remain horizontal during high speed flight.

Each of the pusher propellers 92a, 92b is driven by an engine enclosed within the respective pylon 93a, 93b. The two engines are preferably turbo-shaft engines. Each pylon is thus formed with an air inlet 94a, 94b at the forward end of the respective pylon, and with an air outlet (not shown) at the rear end of the respective pylon.

Figure 23:
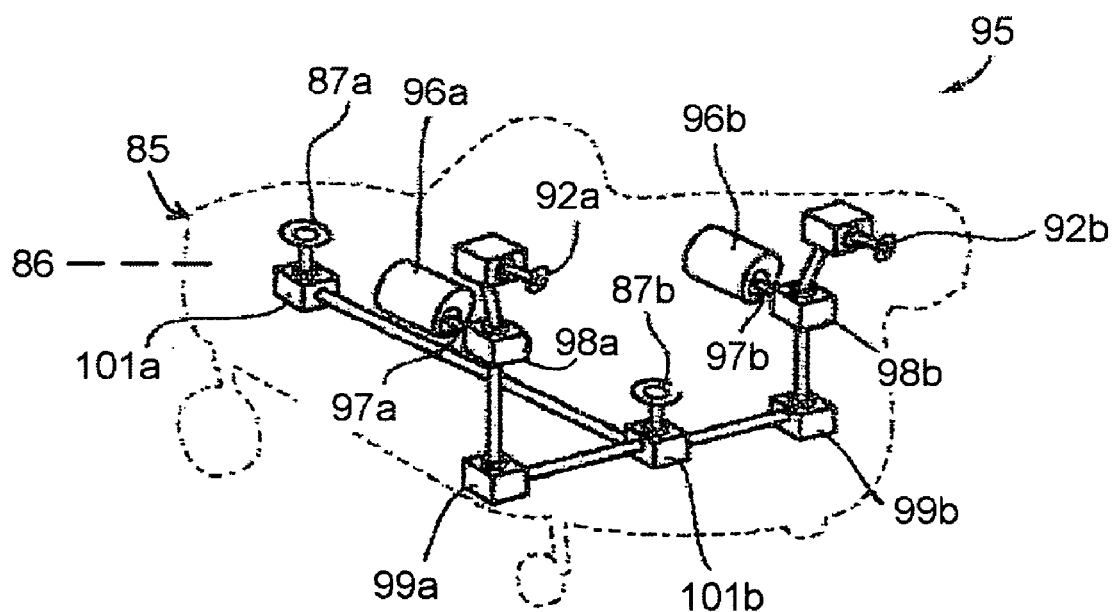
FIG. 23 is a diagram illustrating the drive system in the vehicle of FIGS. 22a-22c.

FIG. 23 schematically illustrates the drive within the vehicle 85 for driving the two ducted fans 87a, 87b as well as the pusher propellers 92a, 92b. The drive system, generally designated 95, includes two engines 96a, 96b, each incorporated in an engine compartment within one of the two pylons 93a, 93b. Each engine 96a, 96b, is coupled by a respective over-running clutch 97a, 97b, to a gear box 98a, 98b coupled on one side to the respective thrust propeller 92a, 92b, and on the opposite side to a transmission for coupling to the two ducted fans 87a, 87b at the opposite ends of the fuselage. Thus, as schematically shown in FIG. 23, the latter transmission includes additional gear boxes 99a, 99b coupled to rear gear box 100 for driving the rear ducted fan 87b, and front gear box 101 for driving the front ducted fan 87a.

Figure 24:
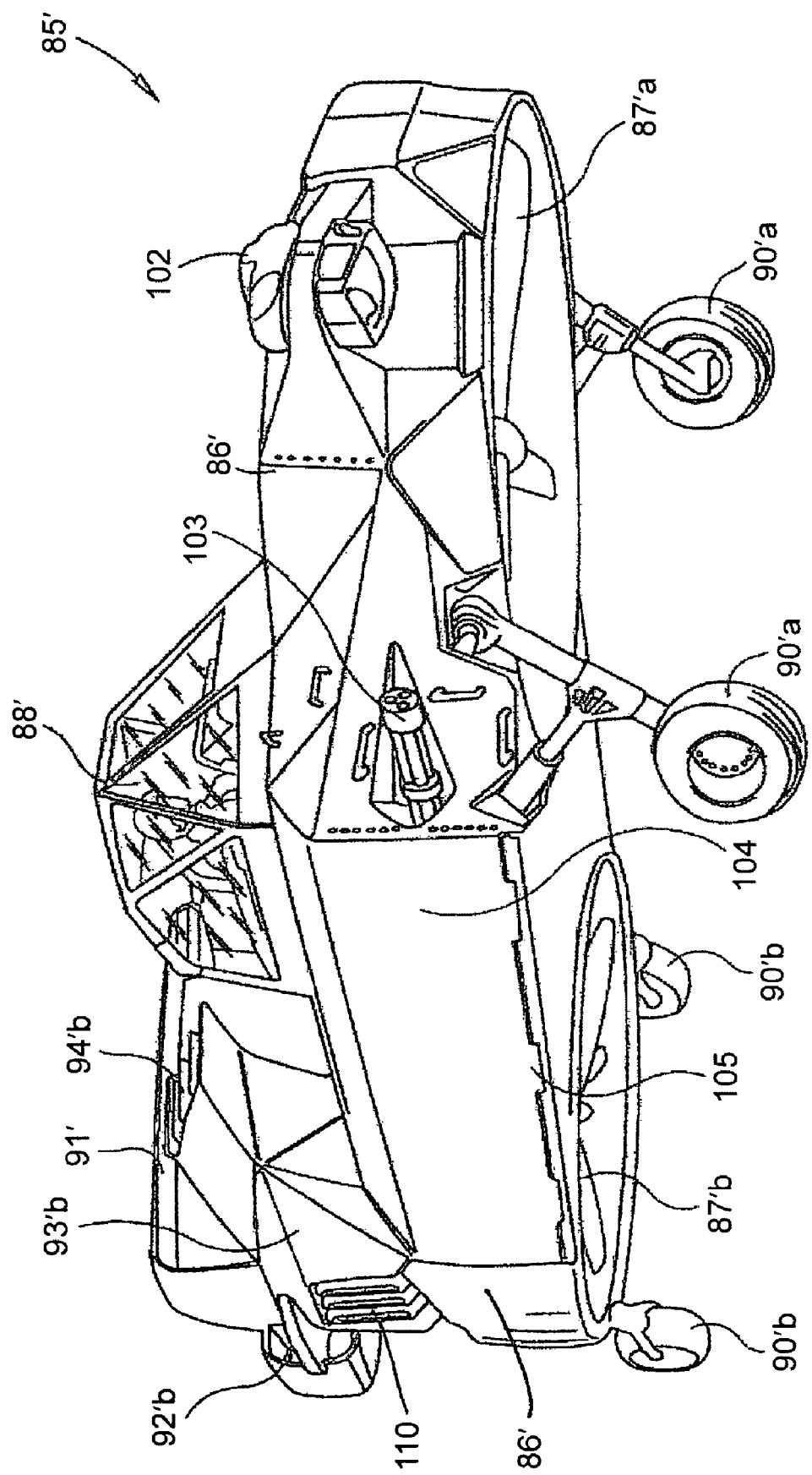
FIG. 24 is a perspective view of an exemplary vehicle constructed in accordance with FIGS. 22a-22c and 23.

FIG. 24 pictorially illustrates another example of the outer appearance that vehicle 85 may take. In FIG. 24, those parts of the vehicle that correspond to the above-described parts in FIGS. 22a-22c are identified by the same reference numeral but with a "prime" suffix added for ease of understanding. FIG. 24, however, illustrates a number of additional features which may be provided in such a vehicle.

Thus, as shown in FIG. 24, the front end of the fuselage 86' may be provided with a stabilized sight and FLIR (Forward Looking Infra-Red) unit, as shown at 102, and with a gun at the forward end of each payload bay (one shown at 103). In addition, each payload bay may include a cover 104 deployable to an open position providing access to the payload bay, and to a closed position covering the payload bay with respect to the fuselage 86'.

In FIG. 24, cover 104 of each payload bay is pivotally mounted to the fuselage 86' along an axis 105 parallel to the longitudinal axis of the fuselage at the bottom of the respective bay. The cover 104, when in its closed condition, conforms to the outer surface of the fuselage 86' and is flush therewith. When the cover 104 is pivoted to its open position, it serves as a support for supporting the payload, or a part thereof, in the respective payload bay.

Figure 25A:
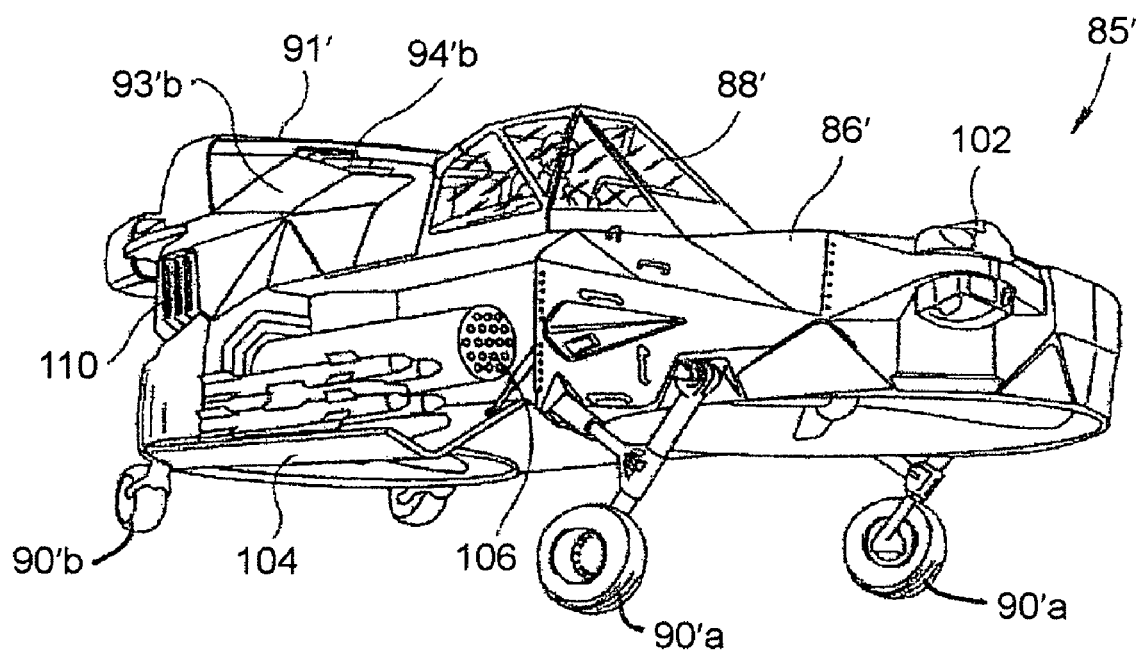
FIG. 25a-25d illustrate examples of various tasks and missions capable of being accomplished by the vehicle of FIG. 24.
Figure 25B:
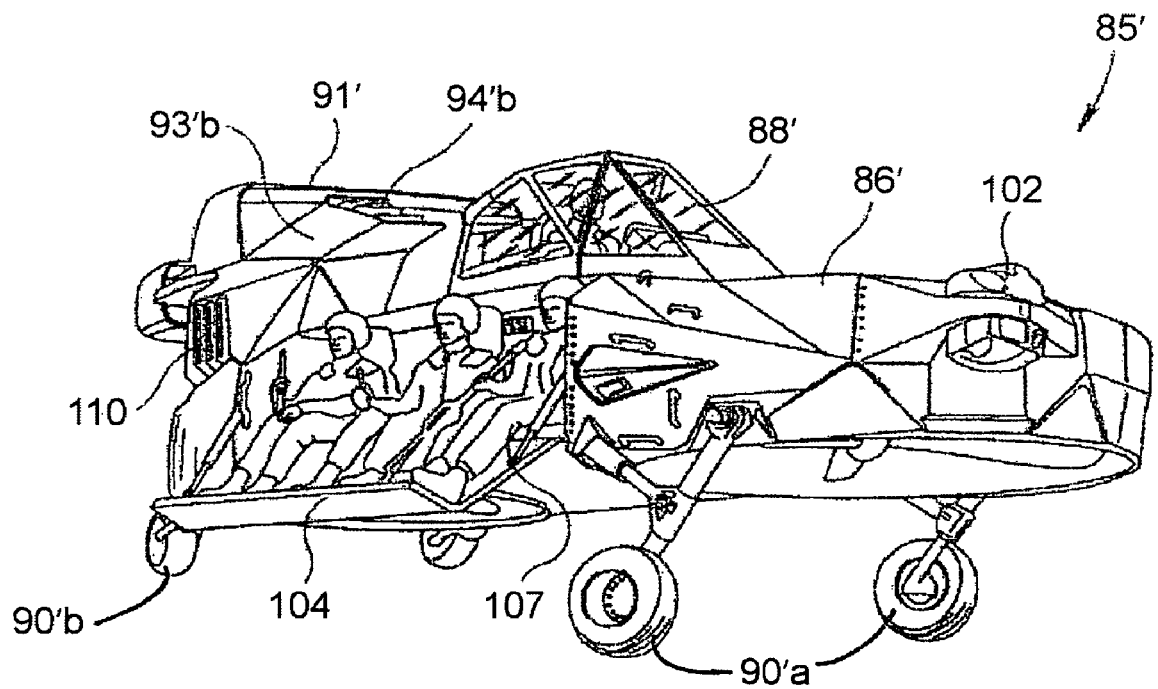
Figure 25C:
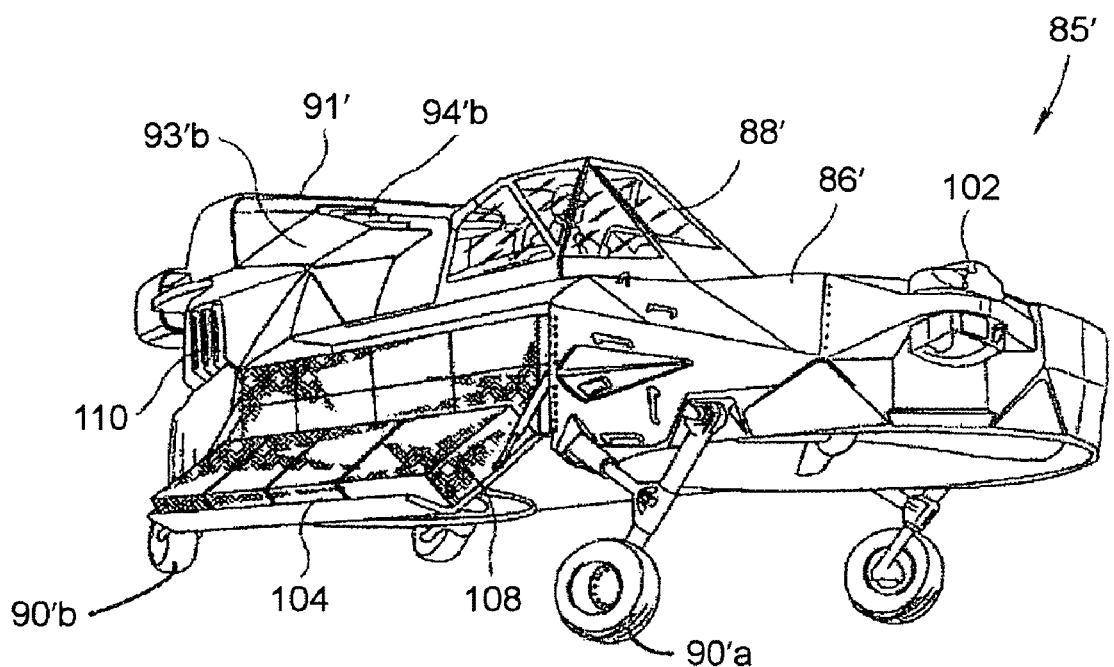
Figure 25D:
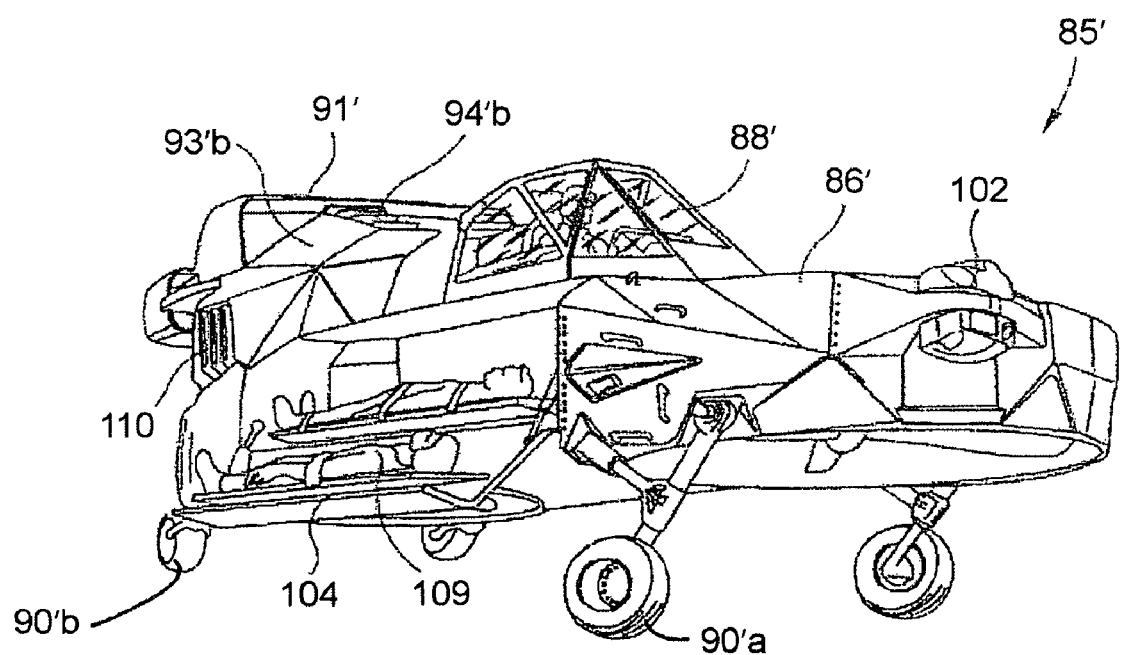

The latter feature is more particularly shown in FIGS. 25a-25d which illustrate various task capabilities of the vehicle as particularly enabled by the pivotal covers 104 for the two payload bays. Thus, FIG. 25a illustrates the payload bays used for mounting or transporting guns or ammunition 106; FIG. 25b illustrates the use of the payload bays for transporting personnel or troops 107; FIG. 25c illustrates the use of the payload bays for transporting cargo 108; and FIG. 25d illustrates the use of the payload bays for evacuating wounded 109. Many other task or mission capabilities will be apparent.

Vehicle 85 also includes air outlets 110 on each of the pylons (only pylon 93'b is visible in FIGS. 24-25D).

Figure 26A:
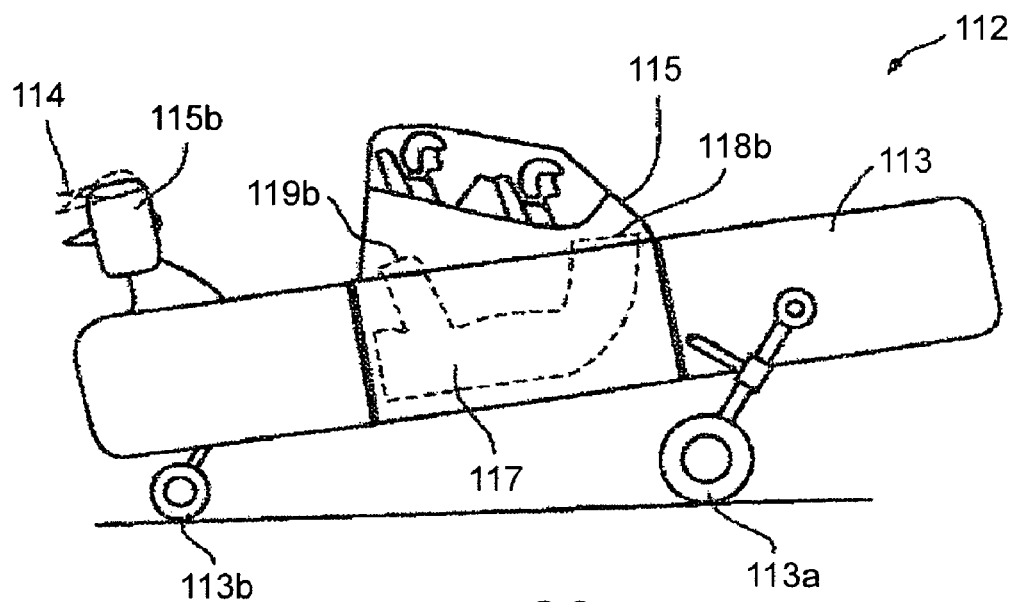
FIGS. 26a and 26b are side and top plan views, respectively, illustrating another exemplary VTOL vehicle constructed in accordance with the present disclosure.
Figure 26B:
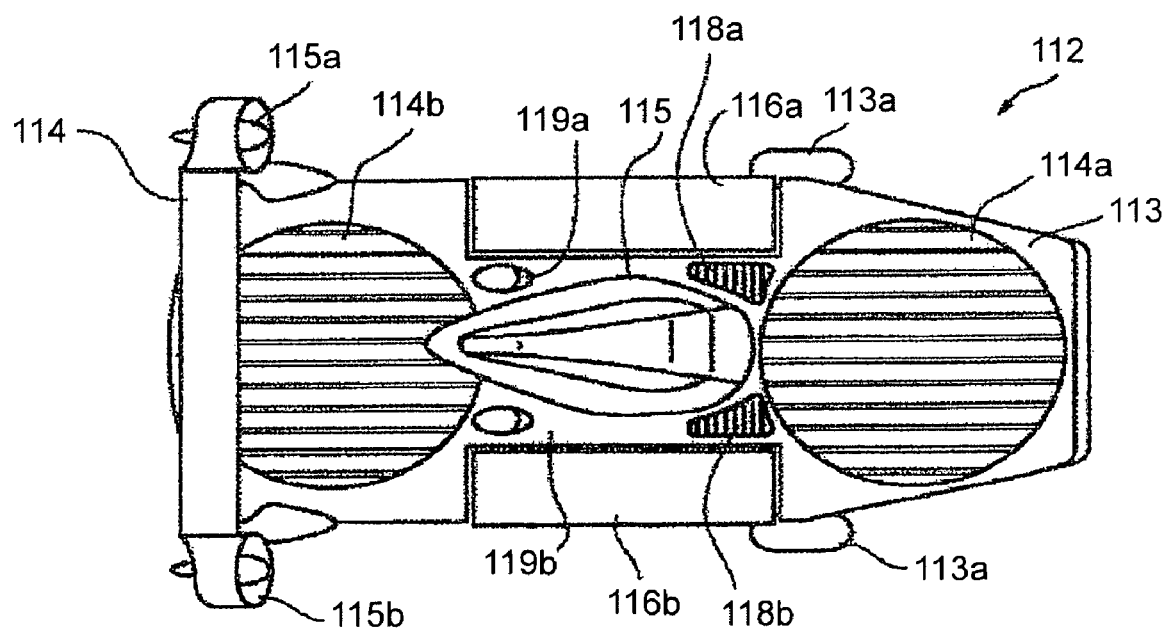

FIGS. 26a and 26b are side and top views, respectively, illustrating another vehicle, generally designated 112, of a slightly modified construction from vehicle 85 described above. Thus, vehicle 112 illustrated in FIGS. 26a and 26b also includes a fuselage 113, a pair of ducted-fan type lift-producing propellers 114a, 114b at the opposite ends of the fuselage, a pilot's compartment 115 centrally of the fuselage, and a pair of payload bays 116a, 116b laterally of the pilot's compartment 115. Vehicle 112 further includes a front landing gear 113a, a rear landing gear 113b, a horizontal stabilizer 114, and a pair of pusher propellers 115a, 115b, at the rear end of fuselage 113.

Figure 27:
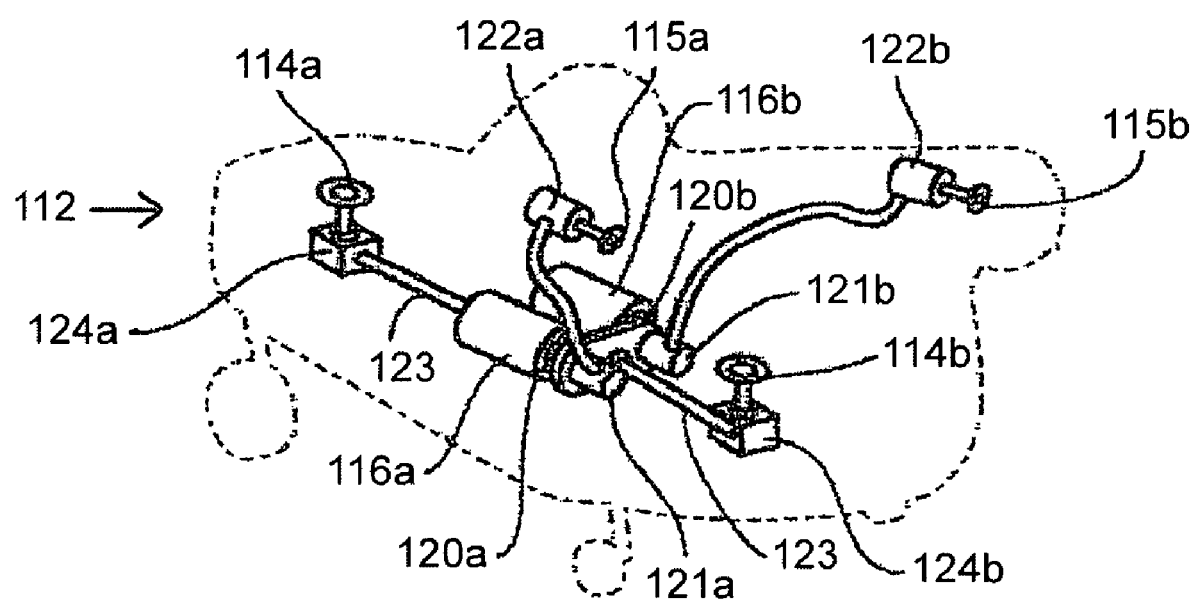
FIG. 27 is a diagram illustrating the drive system in the vehicle of FIGS. 26a and 26b.

FIG. 27 schematically illustrates the drive system in vehicle 90. Thus as shown in FIG. 27, vehicle 90 also includes two engines 116a, 116b for driving the two ducted fans 114a, 114b and the two pusher propellers 115a, 115b, respectively, as in vehicle 85. However, whereas in vehicle 85 the two engines are located in separate engine compartments in the two pylons 93a, 93b, in vehicle 112 illustrated in FIGS. 26a and 26b both engines are incorporated in a common engine compartment, schematically shown at 117, underlying the pilot's compartment 115. The two engines 116a, 116b (FIG. 27), may also be turbo-shaft engines as in FIG. 23. For this purpose, the central portion of the fuselage 113 is formed with a pair of air inlet openings 118a, 118b forward of the pilot's compartment 115, and with a pair of air outlet openings 119a, 119b rearwardly of the pilot's compartment.

As shown in FIG. 27, the two engines 116a, 116b drive, via the over-running clutches 120a, 120b, a pair of hydraulic pumps 121a, 121b which, in turn, drive the drives 122a, 122b of the two pusher propellers 115a, 115b. The two engines 116a, 116b are further coupled to a drive shaft 123 which drives the drives 124a, 124b of the two ducted fans 114a, 114b, respectively.

Figure 28A:
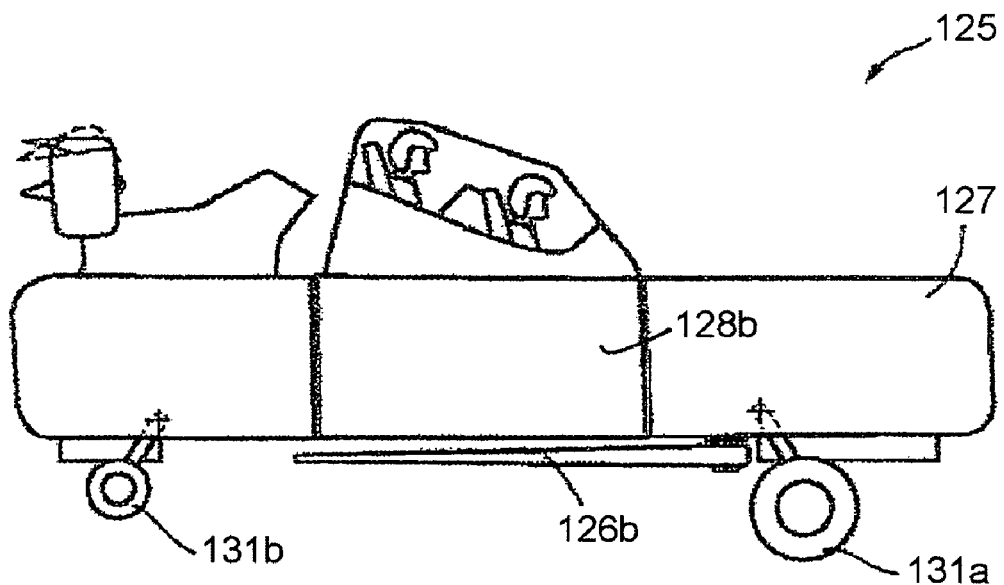
FIGS. 28a and 28b are side and top plan views, respectively, illustrating an exemplary VTOL vehicle constructed in accordance with any one of FIGS. 22a-27 but equipped with deployable stub wings, the wings being shown in these figures in their retracted stowed positions.
Figure 28B:
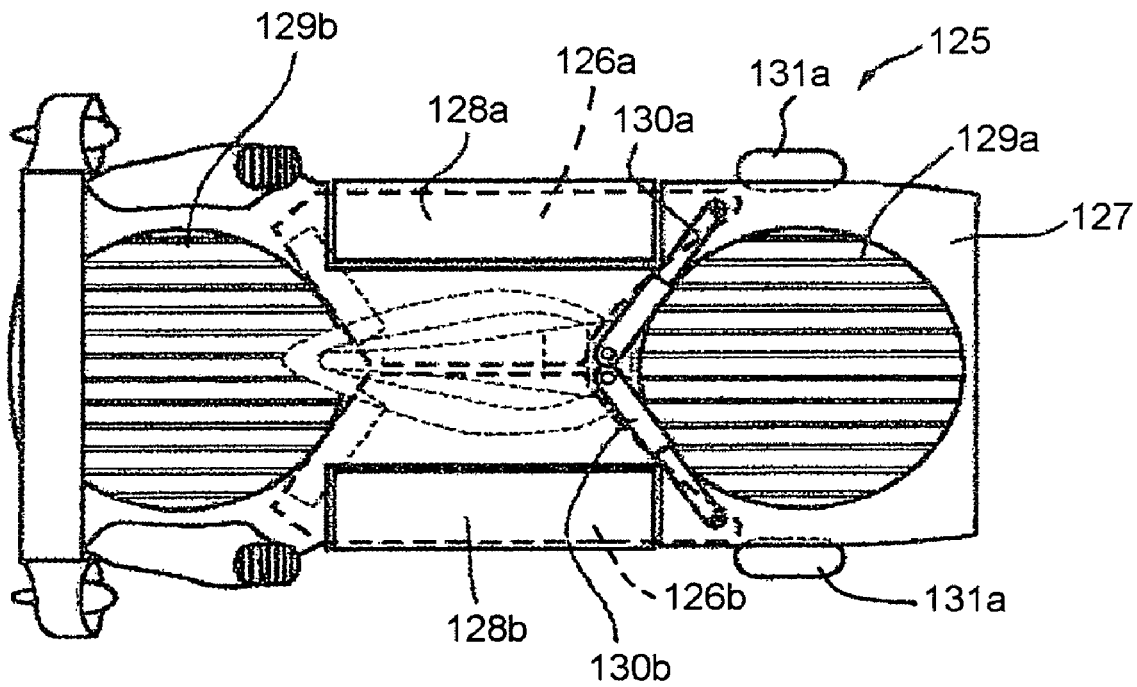
Figure 28C:
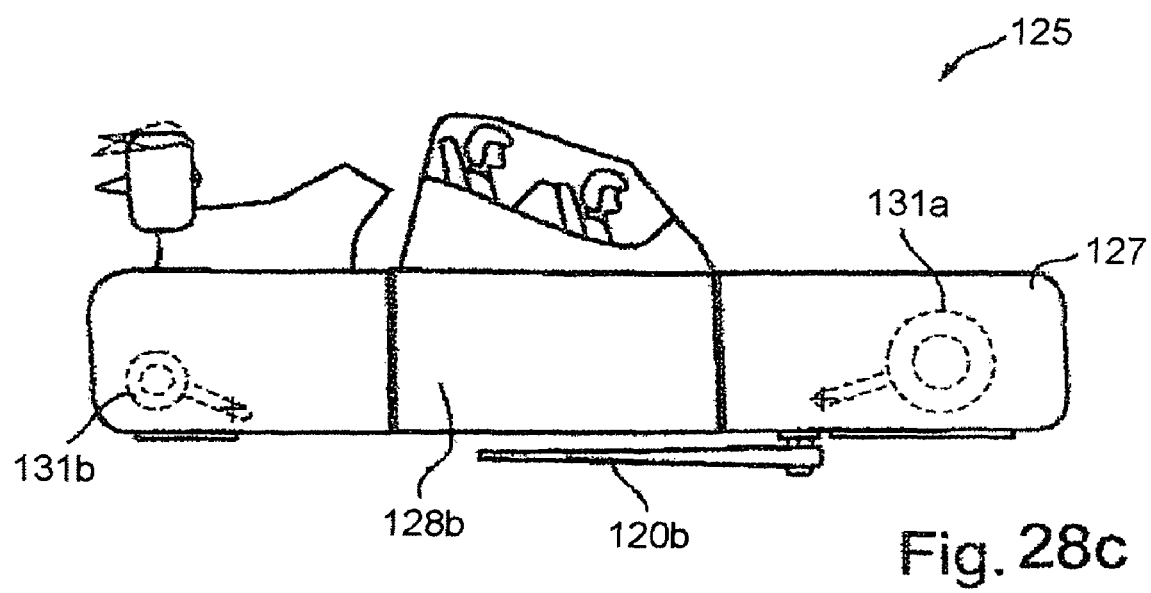
FIGS. 28c and 28d are views corresponding to those of FIGS. 28a and 28b but showing the stub wings in their deployed, extended positions.
Figure 28D:
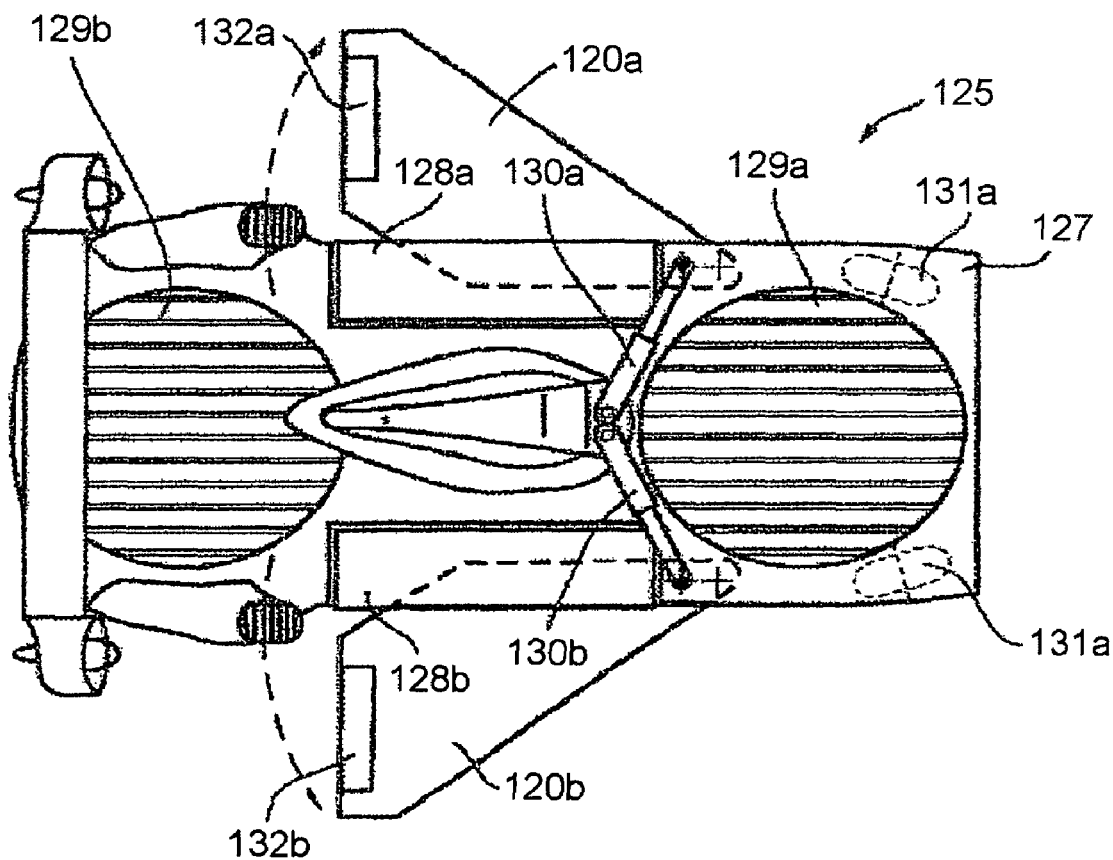

FIGS. 28a-28d illustrate another vehicle, therein generally designated 125, which is basically of the same construction as vehicles 85 and 85' described above. For simplicity, only the differences between vehicle 125 and the earlier described vehicles 85, 85' need be explained in detail. Vehicle 125 is equipped with two stub wings, generally designated 126a, 126b, each pivotally mounted to the fuselage 127, under one of the payload bays 128a, 128b, to a retracted position shown in FIGS. 28a and 28b, or to an extended deployed position shown in FIGS. 28c and 28d for enhancing the lift produced by the ducted fans 129a, 129b. Each of the stub wings 120a, 120b is actuated by an actuator 130a, 130b driven by a hydraulic or electrical motor (not shown). Thus, at low speed flight, the stub wings 120a, 120b, would be pivoted to their stowed positions as shown in FIGS. 28a and 28b; but at high speed flight, they would be pivoted to their extended or deployed positions, as shown in FIGS. 28c and 28d, to enhance the lift produced by the ducted fans 129a, 129b. Consequently, the blades in the ducted fans would be at low pitch producing only a part of the total lift force.

The front and rear landing gear, shown at 131a and 131b, could also by pivoted to a stowed position to enable higher speed flight, as shown in FIGS. 28c and 28d. In such case, the front end of the fuselage 127 would preferably be enlarged to accommodate the landing gear when in its retracted condition. Vehicle 125 illustrated may also include ailerons, as shown at 132a, 132b (FIG. 28d) for roll control.

Figure 29:
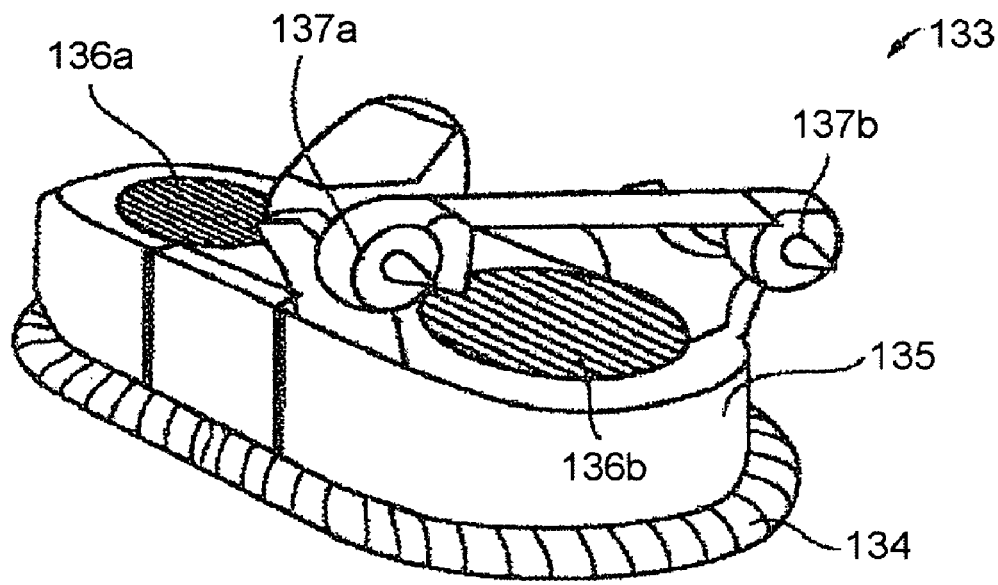
FIG. 29 is a perspective rear view of an exemplary vehicle constructed in accordance with any one of FIGS. 22a-27 but equipped with a lower skirt for converting the vehicle to a hovercraft for movement over ground or water.

FIG. 29 illustrates how a vehicle, such as vehicle 85 illustrated in FIGS. 22a-22d, may be converted to a hovercraft for traveling over ground or water (i.e., at a very low altitude VTOL craft flight condition). Thus, a vehicle 133 is basically of the same construction as described above with respect to FIGS. 22a-22d. In vehicle 133, however, the landing gear wheels have been removed, folded, or otherwise stowed, and instead, a skirt 134 has been applied around the lower end of the fuselage 135. The ducted fans 136a, 136b, may be operated at very low power to create enough pressure to cause the vehicle to hover over the ground or water as in hovercraft vehicles. The variable pitch pusher propellers 137a, 137b would provide forward or rear movement, as well as steering control, by individually varying the pitch, as desired, of each propeller.

Vehicles constructed in accordance with the present invention may also be used for movement on the ground. Thus, the front and rear wheels of the landing gears can be driven by electric or hydraulic motors included within the vehicle.

Figure 30:
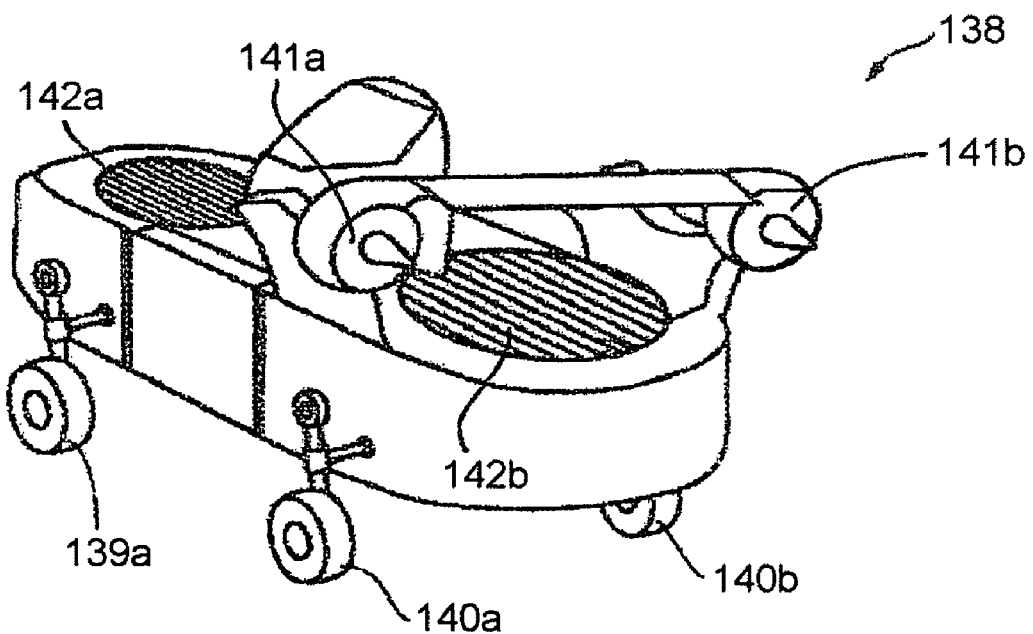
FIG. 30 is a perspective rear view of an exemplary vehicle constructed in accordance with any one of FIGS. 22a-23 but equipped with large wheels for converting the vehicle for ATV (all terrain vehicle) operation.

FIG. 30 illustrates how such a vehicle can also be used as an ATV (all terrain vehicle). For example, a vehicle 138 is basically of the same construction as vehicle 85 illustrated in FIGS. 22a-22d. In vehicle 138, however, the two rear wheels of the vehicle are replaced by two (or four) larger wheels, bringing the total number of wheels per vehicle to four (or six). Thus, as shown in FIG. 30, the front wheels 139a (one shown) of the front landing gear are retained, but the rear wheels are replaced by two larger wheels 140a, 140b or by an additional pair of wheels, not shown), to enable the vehicle to traverse all types of terrain.

When the vehicle is used as an ATV as shown in FIG. 30, the front wheels 139a or rear wheels 140a, 140b would provide steering, while the pusher propellers 141 and main lift fans 142a, 142b would be disconnected but could still be powered-up for take-off if so desired. The same applies also with respect to the hovercraft version illustrated in FIG. 29.

It will thus be seen that the invention thus provides a utility vehicle of a relatively simple structure which is capable of performing a wide variety of VTOL functions, as well as many other tasks and missions, with minimum changes in the vehicle to convert it from one task or mission to another.

Figure 31C:
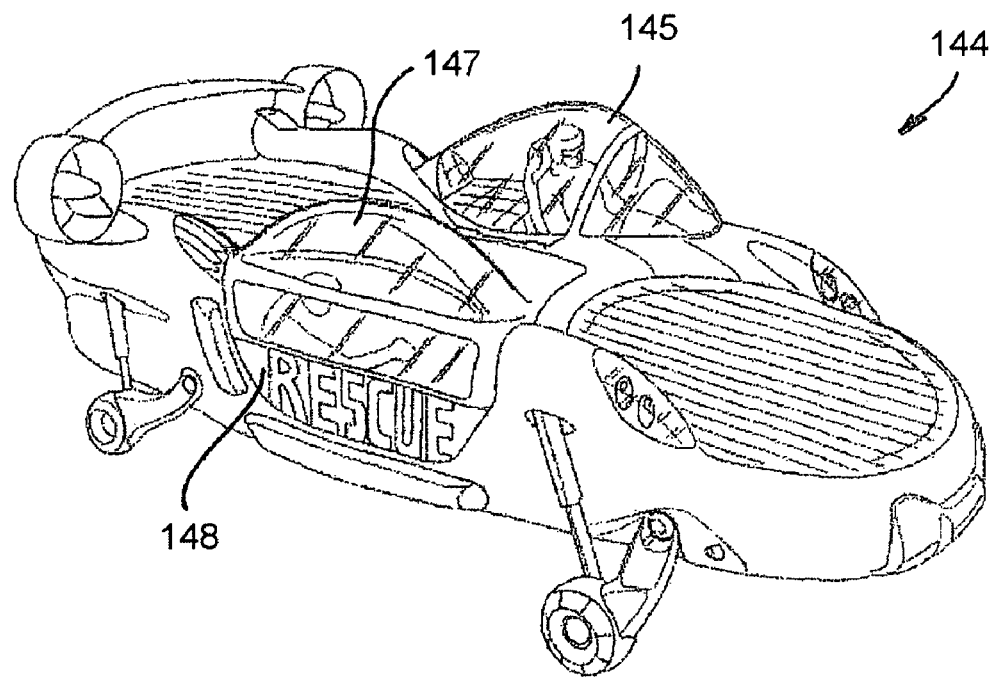

FIGS. 31a-31e are pictorial illustrations of alternative vehicle arrangements where the vehicle is relatively small in size, having the pilot's cockpit installed to one side of the vehicle. Various alternative payload possibilities are shown. For example, FIG. 31a shows a vehicle 144 in the basic form discussed above, with no specific payload installed. The overall design and placement of parts of the vehicle are similar to those of the 'larger' vehicle described in FIG. 24. with the exception of the pilot's cockpit 145, which in the arrangement of FIG. 31a takes up the space of one of the payload bays created by the configuration shown in FIG. 24. This arrangement frees up the area taken up by the cockpit in the arrangement of FIG. 24 for use as an alternative payload area 146, increasing the total volume available for payload on the opposite side of the cockpit. It is appreciated that the mechanical arrangement of engines, drive shafts and gearboxes for the vehicle of FIG. 31a. may be that described with reference to FIG. 23.

FIG. 31b illustrates how the basic vehicle 144 of FIG. 31a may be used to evacuate a patient. The single payload bay is optionally provided with a cover 147 and side door 148 which protect the occupants, and which may include transparent areas to enable light to enter. The patient lies on a stretcher 149 which is oriented predominantly perpendicular to the longitudinal axis of the vehicle, and optionally at a slight angle to enable the feet of the patient to clear the pilot's seat area and be moved fully into the vehicle despite its small size. Space for a medical attendant is provided, close to the outer side of the vehicle.

FIG. 31c shows the vehicle 144 of FIG. 31b with the cover and side door closed for flight.

Figure 31D:
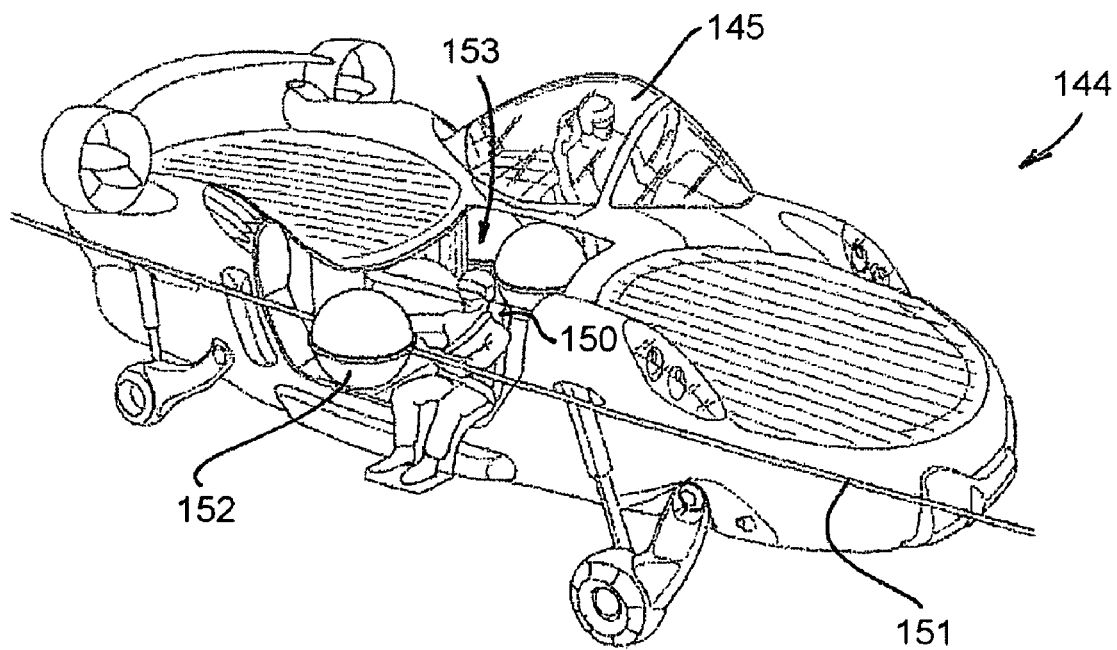

FIG. 31d illustrates how the basic vehicle 144 of FIG. 31a may be used to perform various utility operations such as electric power-line maintenance. In the example shown in FIG. 31d, a seat 150 is provided for an operator, facing outwards towards an electric power-line 151. For illustration purposes, the operator is shown attaching plastic spheres 152 to the line using tools. Uninstalled sphere halves and additional equipment may be carried in the open space 153 behind the operator. Similar applications may include other utility equipment, such as for bridge inspection and maintenance, antenna repair, window cleaning, and other applications. One very important mission that the utility version of FIG. 31d could perform is the extraction of survivors from hi-rise buildings, with the operator assisting the survivors to climb onto the platform while the vehicle hovers within reach.

Figure 31E:
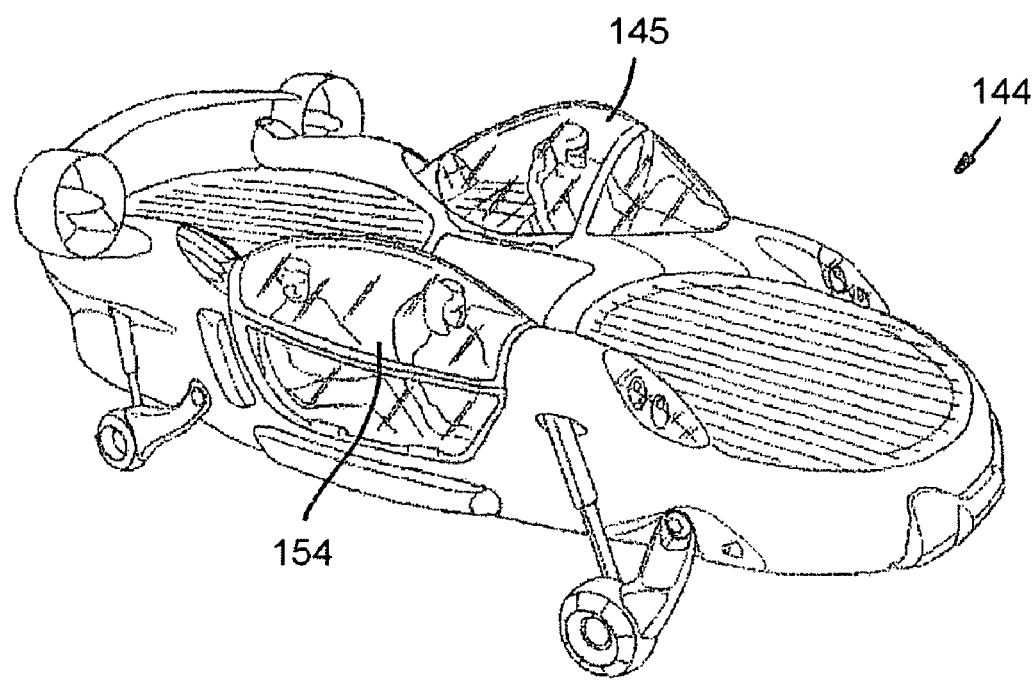

FIG. 31e illustrates how the basic vehicle 144 of FIG. 31a may be used to carry personnel in a comfortable closed cabin 154, such as for commuting, observation, performing police duties, or any other purpose.

Figure 32:
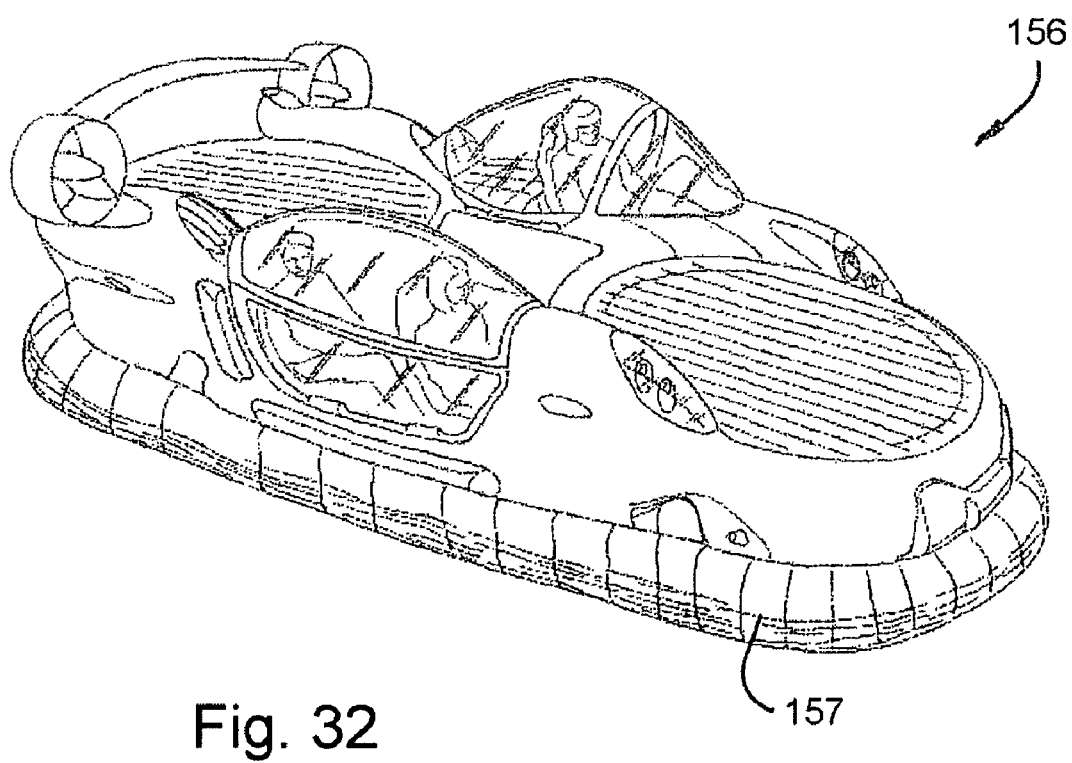
FIG. 32 is a pictorial illustration of an exemplary vehicle constructed typically in accordance with the configuration in FIGS. 31a-31e but equipped with a lower skirt for converting the vehicle to a hovercraft for movement over ground or water.

FIG. 32 is a pictorial illustration of a vehicle 156 constructed typically in accordance with the configuration in FIG. 31 but equipped with a lower, flexible skirt 157 for converting the vehicle to a hovercraft for movement over ground or water. While the vehicle shown in FIG. 32 is similar to the application of FIG. 31e, it should be mentioned that a skirt can be installed on any of the applications shown in FIG. 31.

While FIGS. 31a-32 show vehicles 144, 156 having a cockpit on the left hand side and a payload bay to the right hand side, it is appreciated that alternative arrangements are possible, such as where the cockpit is on the right hand side and the payload bay is on the left hand side. All the descriptions provided in FIGS. 31a-32 apply also to such an alternative configuration.

Figure 33:
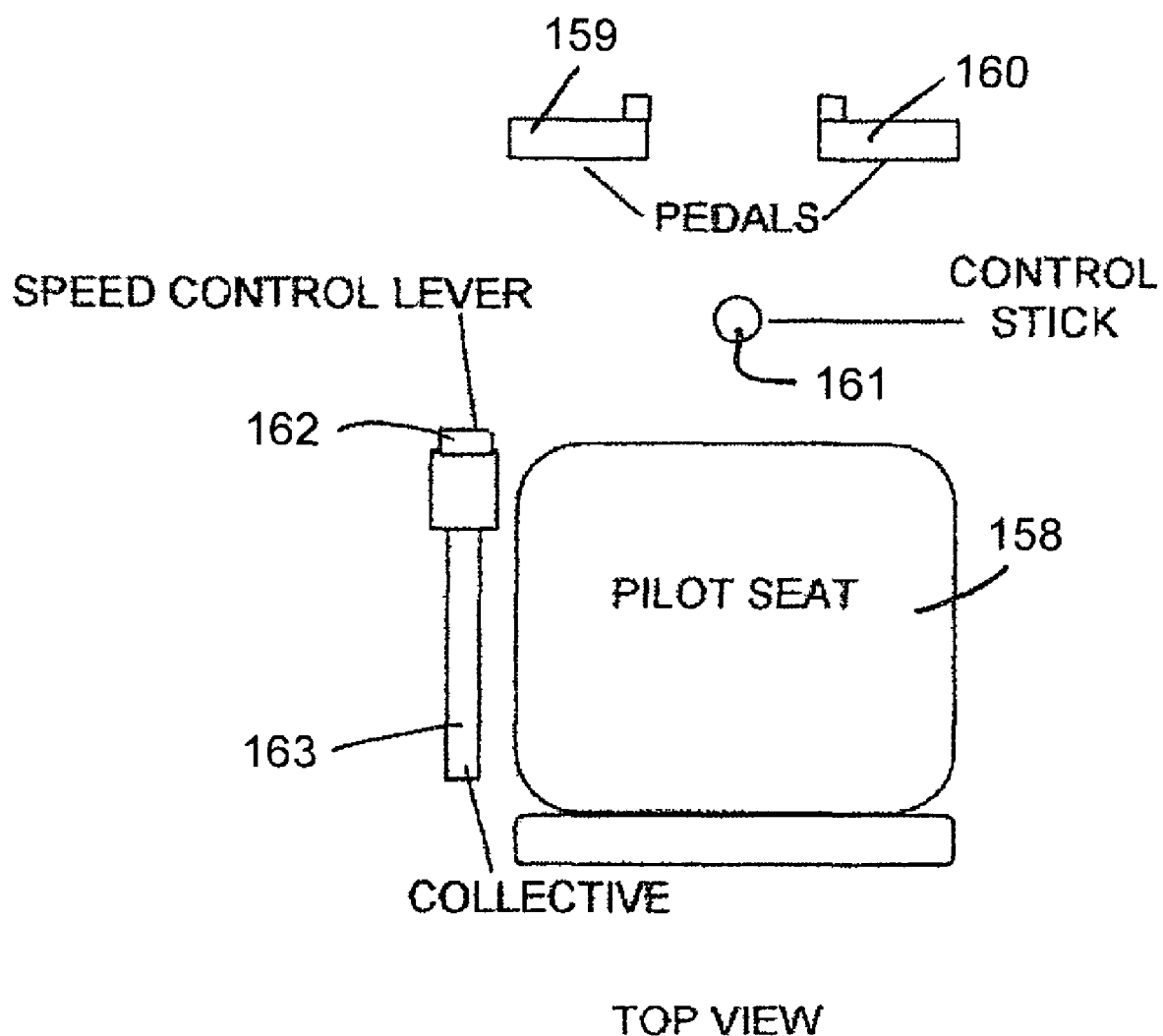
FIG. 33 is a pictorial illustration of a cockpit control configuration, constructed and operative in accordance with an exemplary embodiment of the present invention.

FIG. 33 shows a cockpit control configuration that may be used in any of the various vehicle configurations of the present invention described herein. The necessary pilot-input control components are located in proximity to the pilot seat 158. Thus, foot pedals 159, 160 that control yaw and control stick 161 that controls roll and pitch are located directly in front of the seat 158. A speed control lever 162 and a collective control stick 163 (for controlling pitch of the ducted fan rotors) are located to one side of the seat 158. The illustrated arrangement may be varied as desired. For example, the pedals can be replaced by a "twist" control function of the main control stick. Any other type of possibly desired pilot controlled input sensor arrangements can be used at the option of the system designer as will be appreciated.

Figure 34:
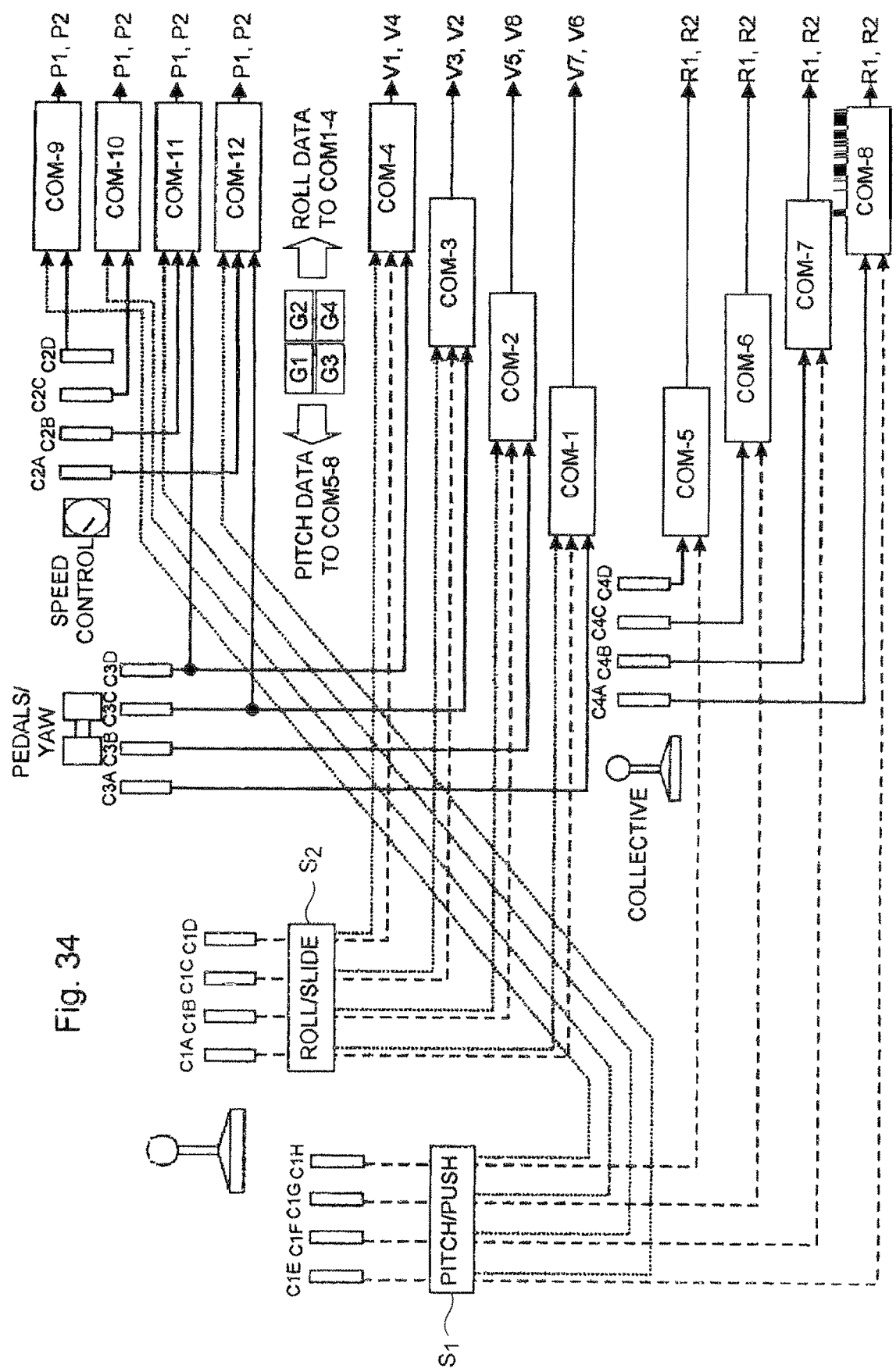
FIG. 34 is a simplified block diagram of a multi-channel flight control system, constructed and operative in accordance with an exemplary embodiment of the present invention.

Reference is now made to FIG. 34, which is a simplified block diagram of a multi-channel flight control system, constructed and operative in accordance with an exemplary embodiment. The various vane-controlled vehicle configurations may be equipped with the multi-channel flight control system of FIG. 34, or portions thereof as applicable, although it is appreciated that aspects of the system of FIG. 34 that do not relate to vane control may be applied to non-vane-controlled vehicles. The flight control system is designed in a manner that will ensure the safety of the vehicle in event of a malfunction in any one of the channels and enable the flight to continue down to a safe landing. In order to facilitate this feature, the system is configured as a Fly-By-Wire system, separated into channels, with each channel having its own cockpit controls sensors, computer, actuator and control surfaces or variable pitch rotor/propeller blades where applicable. Each vehicle control function preferably has a control power reserve that enables the vehicle to be adequately controllable even if some control power is lost due to malfunction or a runaway condition (e.g., an "upset") in one of its channels. Separate vehicle position, rate and acceleration sensors together with altitude and airspeed data sensors are used to generate data on the vehicle's flight state.

It will be appreciated that the number of sensors, computers and channels shown in FIG. 34 may vary, provided that each of the vehicle's axes is provided multiple control paths such that loss of any given control path, while resulting in the path's controlled element being unable to perform its function, does not influence the remaining paths/channels on the same control axis from continuing to perform their duties as required.

The various control paths are shown in FIG. 34 by lines ending with arrows. Solid lines represent control paths that are constant throughout the flight envelope. Dashed lines represent paths that operate at high speed (cruise) flight, and dotted lines represent paths that are active during hover and Low Speed Maneuver (LSM) flight.

Logical switching, or, alternatively, continuous gain scheduling, is used to transition between LSM to cruise and vice versa. These switching modules are shown as rectangles marked as S1, S2.

| Also shown in FIG. 34 are: | |
| --- | --- |
| COM1-COM12 | Flight control computers |
| P1, P2 | Pusher propellers |
| R1, R2 | Main lift rotors |
| V1-V8 | 8 segments of control vanes |
| C1-C4; a-h | Controls position sensors |
| G1-G4 | Four vehicle inertial position, rate and acceleration, altitude and airspeed sensors. Additional sensors such as, but not limited to, GPS, radar altimeters, millimeter wave radars may be added. |

As can be seen in FIG. 34, the control system is divided into three main control functions:

Control of the blades pitch angle on both main lift rotors R1, R2;

Control of all aerodynamic vane segments V1-V8 installed on the vehicle in the entrance plane as well as the exit plane of both main lift rotors; and Control of the blades pitch angle on both aft mounted pusher propellers P1, P2 such as may be particularly seen in FIGS. 31a-31e.

Each control function features four separate channels/paths, i.e., control groups which include 4 cockpit controls position sensors (e.g. potentiometers, LVDTs, RVDTs), 4 control computers (e.g., control computer subsystems perhaps including plural computers), and 4 actuators, each powering ¼ of the control mechanisms (such as vanes) installed on the vehicle. In the case of actuators for rotor/propeller blade pitch change, each actuator will have four separate movement channels, each responsible for ¼ of the total movement available for full control of said rotor or propeller.

Operation of the control system of FIG. 34 is now described with respect to the main lift rotors R1, R2. Control of the pitch of the blades on both main lift rotors is accomplished by four separate computers (COM-5-COM-8) via input at the collective stick 163. Each computer independently reads the position of the collective control, as well as the longitudinal stick position. Each computer also reads information on the vehicle inertial position, rate and acceleration, altitude and airspeed from one of the four inertial position, rate and acceleration, altitude and airspeed sensors G1-G4 installed in the vehicle. Each computer commands ¼ of the available travel of each of the two blade pitch change actuators connected to the main lift rotors R1, R2 (e.g., through corporate-styled system of bell crank pairs individually actuated against suitable lever arms to provide a cumulative total mechanical motion at an output side that represents the sum of individual actuator movements). When the vehicle is in LSM mode, the information on the longitudinal stick position does not come into play in the main lift rotors control system. As vehicle motion becomes more "cruise" oriented, and less "LSM" oriented, each of the four computers COM-5-COM-8, operating separately from each other, will switch or modify the gain associated with the reading on the position sensors attached to the pilot's controls in order to obtain the desired effect on the rotors. The software governing the operation of each computer, and especially the gain scheduling associated with the mode transitions in flight, may employ conventional techniques, or may be based on Fuzzy Logic/Neural computation methods as will be appreciated by those in the art.

Due to the above arrangement, a failure of one channel of the four will merely result in the main lift rotors not being able to change their blade pitch angles through more than ¾ of their overall range. It will be appreciated that in event of a runaway malfunction (i.e., a total "upset" condition), half of the normal travel will still be available. It will be further appreciated by analyzing the overall behavior of the vehicle that sufficient control is still available for carrying out controlled descent to landing.

Operation of the control system of FIG. 34 is now described with respect to control of the vehicle's aerodynamic vane surfaces. In an exemplary configuration a vehicle has 400 vanes powered by 8 separate actuators, each controlling one of the vane segments V1-V8, in a manner similar to that which is required for rotor blade pitch change, utilizing computers COM-1-COM-4. However, here each actuator moves its own set of vanes through the total useful range of movement of the vanes, such as 10 degrees to each side and as dictated by aerodynamic considerations. Other arrangements are possible, including dividing the vanes into 16 segments of 25 vanes each, controlled by 16 respectively associated actuators.

Operation of the control system of FIG. 34 is now described with respect to control of the vehicle's pusher propellers P1, P2. Control of the vehicle pusher propellers is similar to that of the main lift rotors, utilizing computers COM-9-COM-12. However, it will be appreciated that since the pusher propellers are not as critical to controllability of the vehicle and its ability to perform a safe landing, the redundancy provided to the pusher propellers may be reduced, such as to two control channels instead of the four-channel arrangement shown for the other control functions.

Operation of the control system of FIG. 34 is now described with respect to control of the vehicle's inertial and other sensors. In the system of FIG. 34, four separate inertial position, rate and acceleration, altitude and airspeed sensors G1-G4 are installed, with pitch data input to COM5-COM8 and roll data input to COM1-COM4. However, any of the control channels may share data generated on common sensor units. Thus, any error or malfunction of one sensor inside one of the four sensor packages may affect all three groups of controls: main rotors, vanes and pusher propellers. The design of the vehicle should be sufficiently robust enough so that any "crippling" of all modes of control, while not causing a hazardous situation with any of the controls separately, will still not pose a threat to the vehicle's safety when, as a result of one sensor malfunction, all three control functions are crippled or weakened simultaneously. Alternatively, additional sensor packages or individual sensors may be added as desired.

FIG. 35 shows a table summarizing the effect that each control has on the vehicle in two different flight conditions: hover and LSM (Low Speed Maneuver), and normal cruise flight.

It is appreciated that the various control surfaces may be divided into more or fewer sections shown in FIG. 34, each independently controlled by a separate control path. It is also appreciated that each computer may control more than one control path of the vehicle, provided that each control path relates to a different type of vehicle control, such as pitch and yaw.

Figure 36:
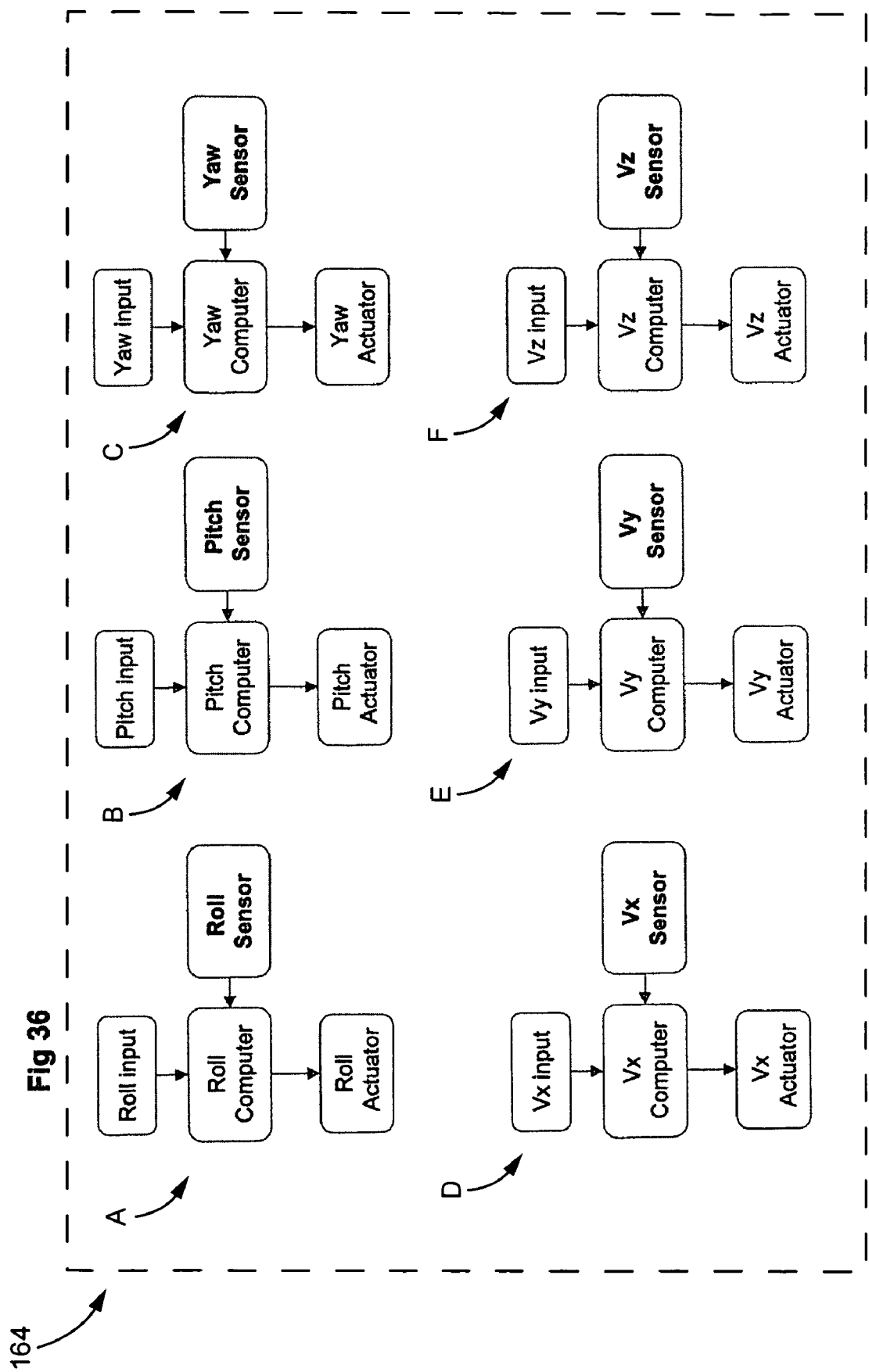
FIGS. 36-40 illustrate an alternative flight control system arrangement, constructed an operative in accordance with another embodiment of the present invention.

Reference is now made to FIGS. 36-40, which illustrate an alternative flight control system arrangement 164. A typical control system includes 3 elementary parts: input, output and feedback. In a flight control system the inputs are typically the pilot grips (including all pilot controls such as pedals, collective, etc.), the outputs are typically the various actuators in the vehicle and feedback is typically provided by sensors that measure the inertial parameters of the vehicle. Typically, each FCS output controls one of the vehicle's 6 degrees of freedom (DOF). FIG. 36 illustrates a typical FCS with 6 control subsystems A-F, each corresponding to one DOF and having an input, sensor, computer and actuator.

The FCS may control the vehicle in all 6 DOF (i.e. 3 angular velocities and 3 linear velocities) but need not be limited to this number of control parameters (i.e. speed control, altitude control may be also controlled by the FCS).

Figure 37:
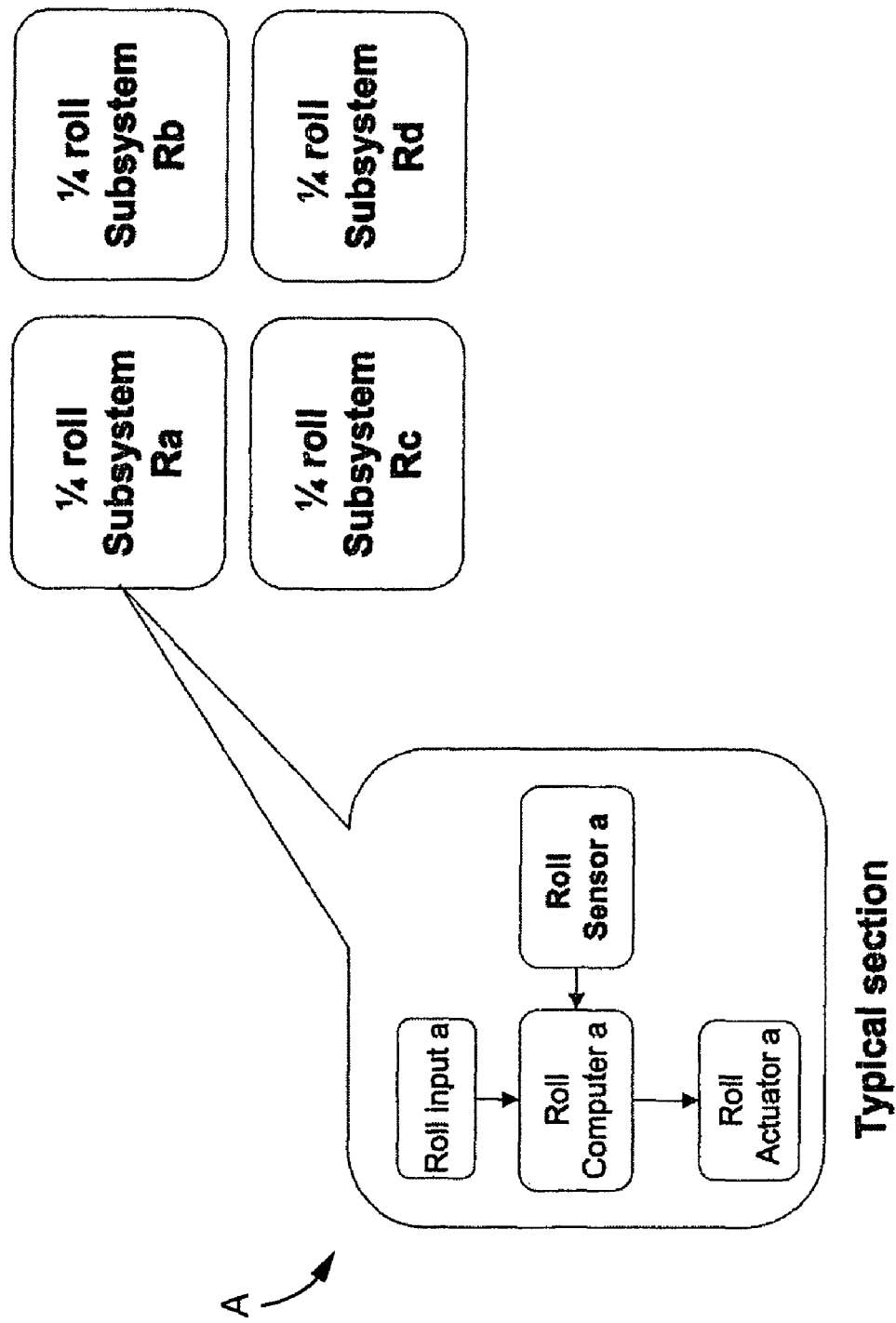

The control system architecture is designed in a manner that will ensure a safe landing of the vehicle in the event of malfunction of any individual part of the FCS (i.e. first malfunction of any part of the FCS system). In order to facilitate this feature each input and output control element is divided into more than one section, each having substantial (whether equal or unequal) control power (CP). In the illustrated embodiment, each control element of the FCS may be divided into 4 equal sections having equal CP. The description herein assumes this number of sections but it is not necessarily limited to 4 or any other number of sections. FIG. 37 illustrates one such control subsystem, using subsystem A from FIG. 36 by way of example. For each such subsystem, there are 4 independent input Potentiometers (or RVDT, LVDT or any other pilot command input sensor or measuring device) that read the pilot command, 4 actuators, each one controlling part of the total control power (CP) of this subsystem, and 4 sensors, each one measuring the physical parameter, such as roll pitch and yaw rate and X Y and Z velocities (where X,Y and Z represent Cartesian coordinates), for feedback. The sum of the CP of all the sections is higher than the CP required for safe landing.

Figure 38:
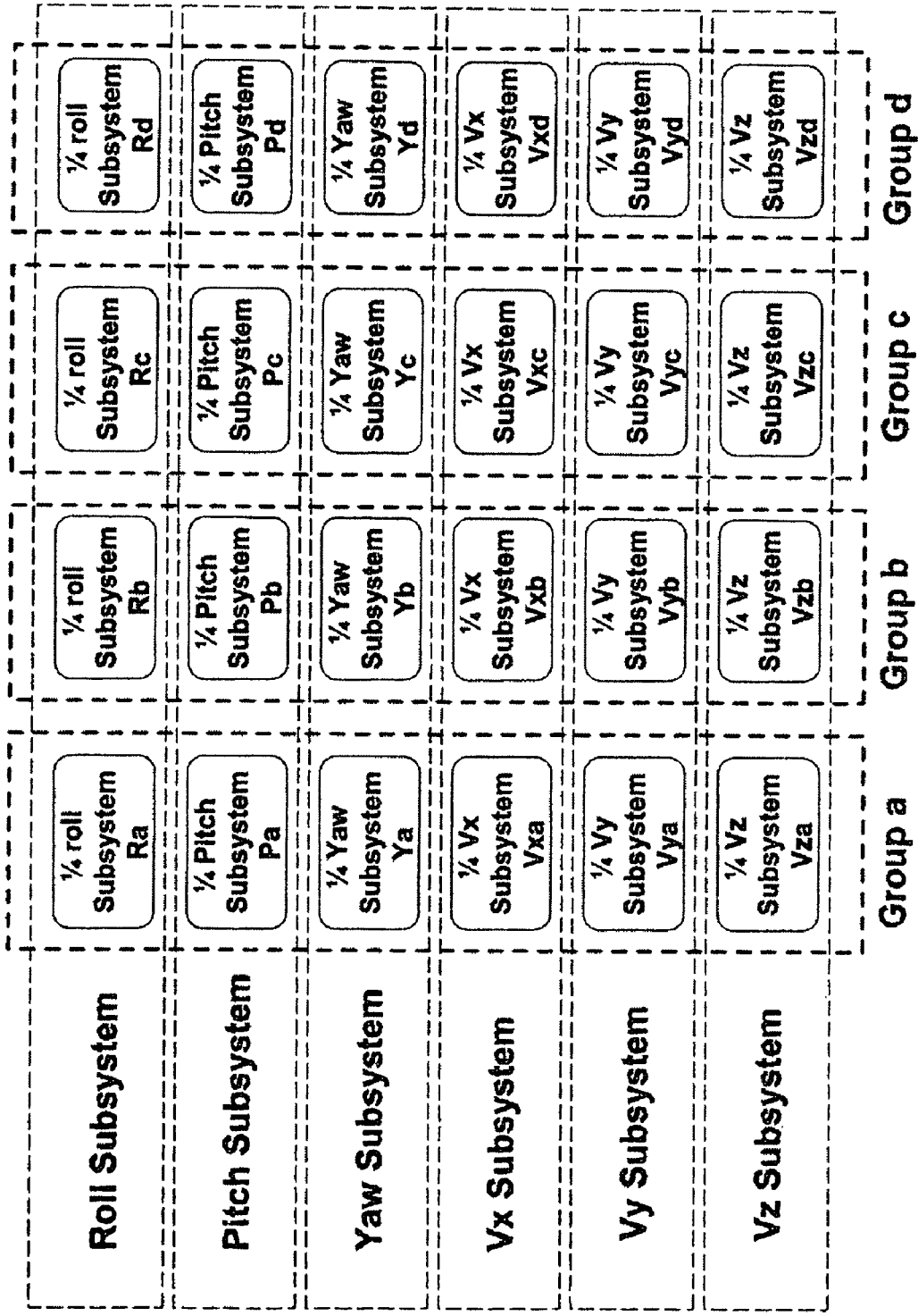

FIG. 38 illustrates one exemplary grouping method where the control subsystems are grouped into 4 groups according to the following rules:
1. In each group there are at least 2 and as many as 6 different subsystems that partially control from two to six different DOF's
2. The subsystems within each group may share one or more computers using conventional control rules to compute the control outputs
3. Each group is characterized by having one or more points where a failure (i.e. the computer, sensor pack etc.) will cause the entire group to fail.
4. Each group effectively operates independently from the other groups.

Note, however, that some information still may be shared between groups for some purposes (e.g., performance monitoring, telemetry, failsafe features, etc.) so long as the overall FCS still exhibits an ability to continue controlled descent to landing even in the event of a complete catastrophic failure of one of the groups at one of its single points of possible failure.

A single point of failure is a failure that will shut down an entire group.

The FCS subsystem sections are preferably grouped in a manner that in one group there is one section from each subsystem.

Figure 39:
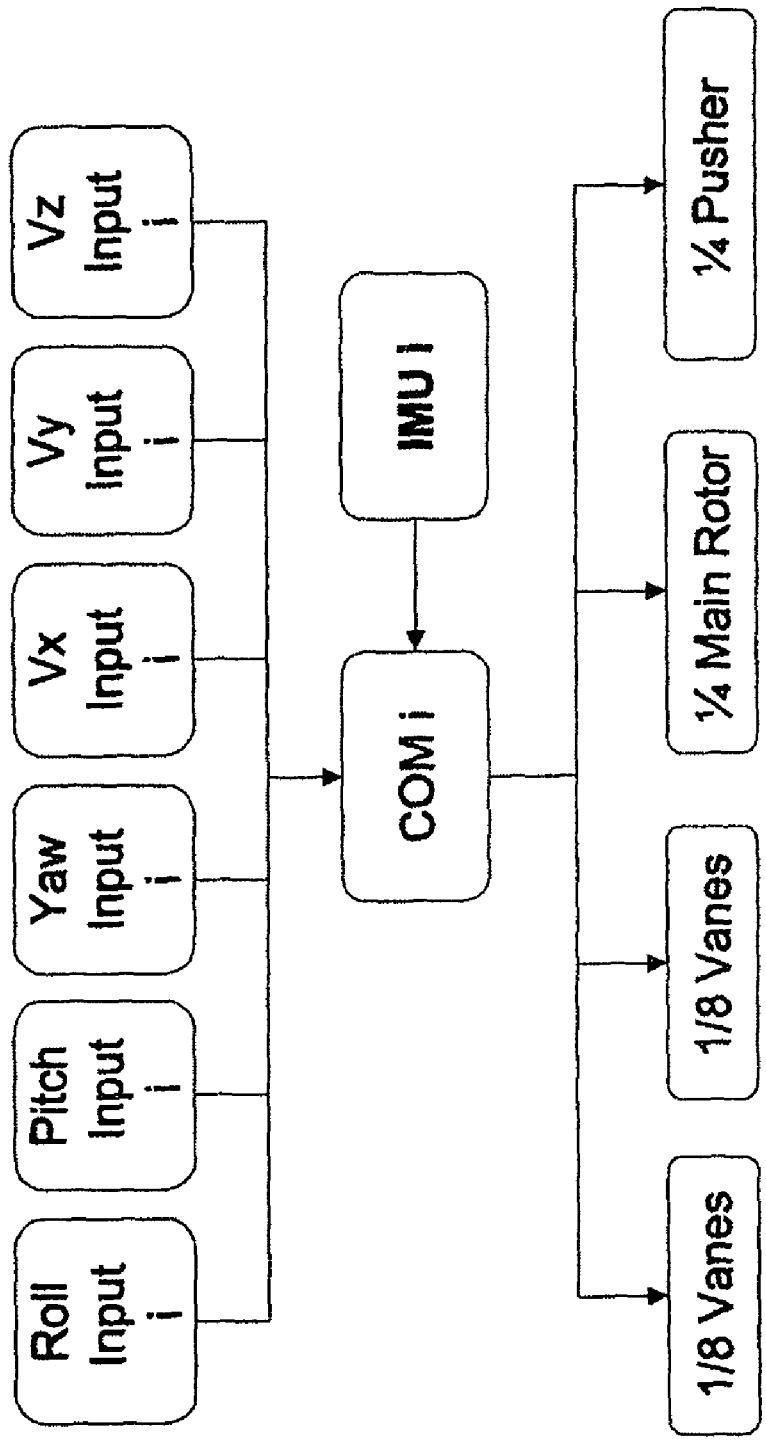

FIG. 39 illustrates a typical group in accordance with an exemplary embodiment. One single point of failure is the computer and the IMU sensor. The group has 6 inputs from the pilot grips. The IMU block represents a collection of sensors that supply the feedback path to the subsystems. These sensors may measure inertial or non-inertial parameters or any other physical parameters that are required for the control system. Control systems that control a physical parameter require a feedback channel that measures the controlled parameter and compares it to the desired one. This is called a feedback path. For example if the roll rate is to be controlled, current roll rate is measured and compared to the desired roll rate to provide a command signal to the appropriate actuator. The IMU may be packed in a single package that transfers the information in a single transmission path (thus also becoming a single point of failure) or it may be a collection of separate sensors that transfer the information in multiple transmission paths (and thus not providing a single point of failure). The control loop calculation is performed by the computer and the output is forwarded to 4 actuators, each one controlling a different subsystem. In the current example there are only 4 outputs that control all 6 DOF since the two ⅛ vanes outputs control the roll, yaw and Vy, as will be explained later.

Figure 40:
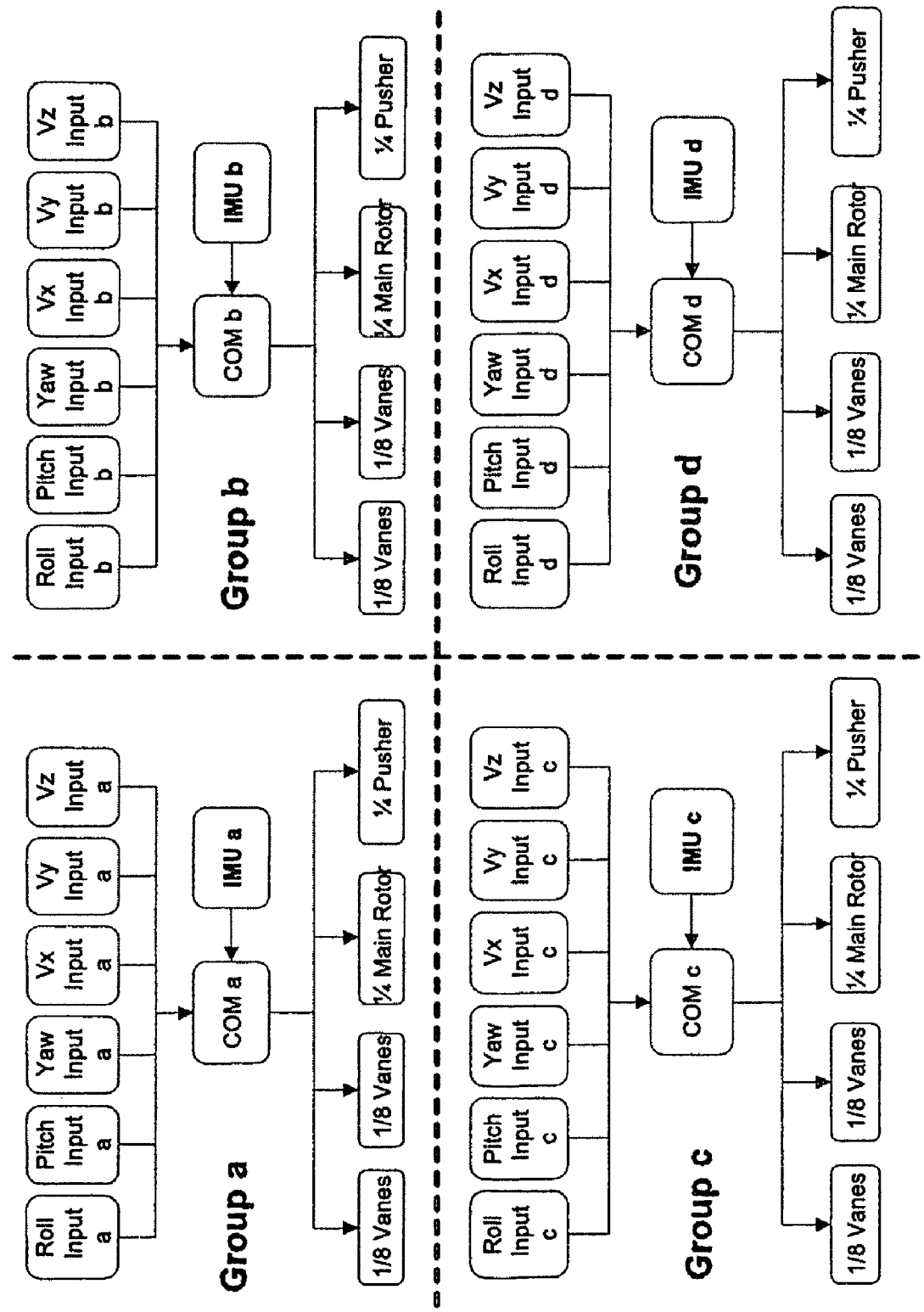

FIG. 40 illustrates exemplary FCS groups in an exemplary vehicle. The FCS is divided into n, for example 4 independent groups a-d, each group controlling 1/n or, in this case, ¼ of the total CP of the vehicle. This arrangement is particularly useful in the event that twice the control power (CP) required to fly the vehicle is made available by system design. Each group has its own inputs from the pilot grips, inputs from the IMU and a computer that generates the output for the actuators. Note that each group receives inputs relating to each of the 6 DOF.

A failure sequence description in this embodiment is as follows: A malfunction in any of groups a-d can cause a partial or total malfunction of that group or of any of its subsystems. In case of partial or total failure the CP of the remaining groups will remain sufficient for safe landing. It should be mentioned that in a case where the overall CP is significantly higher that the CP required for safe landing, the loss of even more than one group may potentially be tolerated, depending on the configuration. Thus, for example, where $CP_x$ is the control power required for a safe landing, and m of n groups fail, as long as the $CP_r$ of the remaining n–m groups is $>=CP_x$, the vehicle may land safely.

Operation of the control system of FIG. 40 is now described with respect to the main lift rotors. Control of the pitch of the blades on both main lift rotors may be accomplished by four separate computers in four separated groups (COM a-d). Each computer independently reads the position of the collective control, as well as the longitudinal stick position. Each computer also reads information on the vehicle inertial position, rate and acceleration, altitude and airspeed from the inertial position, rate and acceleration, altitude and airspeed sensors connected to the computer. As previously described, each computer may command ¼ of the available travel of the blade pitch change actuators connected to the main lift rotors. However, if desired, the variable pitch blades of the main lift rotor may be controlled by just two groups, each commanding ½ of the blade pitch adjustments.

Due to the above arrangement, a failure of one group of the four will merely result in the main lift rotors not being able to change their blade pitch angles through more than ¾ (or ½ if controlled by two groups) of their overall range. It will be appreciated that in event of a runaway malfunction (e.g., complete reverse position of one group), half of the normal travel will still be available. It will be further appreciated by analyzing the overall behavior of the vehicle that sufficient control is still available for carrying out a controlled descent to a landing assuming $CP_r \geq CP_x$.

Operation of the control system of FIG. 40 is now described with respect to control of the vehicle's aerodynamic vane surfaces. In an exemplary configuration a vehicle has 400 vanes powered by 8 separate actuators in a manner similar to that which is required for rotor blade pitch change. However, here each actuator moves its own section or segment of typically 50 vanes through the total useful range of movement of the vanes, such as 10 degrees to each side and as dictated by aerodynamic considerations. Any two sections of vanes control the vehicle in roll, yaw and Vy DOF depending on the relative vane movement between these two sections. Each group controls two sections of vanes, therefore each group controls both roll yaw and Vy DOF. As mentioned above, alternative arrangements may include 16 segments of vanes (25 vanes per segment) controlled by 16 actuators. In this arrangement, four vane actuators would be included in each control group. It will be appreciated that in the event of a "hardover" failure, where the vanes in a group move to a position fully opposite the desired position, then all of the vanes of a second group will be required to cancel the effect of the first group, leaving the vanes of the third and fourth groups to provide flight control sufficient to safely land the vehicle. In any event, each group contributes to control of the vehicle in all six DOF.

Operation of the control system of FIG. 40 is now described with respect to control of the vehicle pusher propellers, or ducted thrust fans. Control of the vehicles pusher propellers or thrusters is similar to that of the main lift rotors. However, it will be appreciated that since the pusher propellers are not critical to the controllability of the vehicle and its ability to perform a safe landing, the redundancy provided to the pusher propellers may be reduced, such as to two control groups instead of the four-group arrangement shown for the other control groups.

Operation of the control system of FIG. 40 is now described with respect to control of the vehicle inertial and other sensors. In the system of FIG. 40, four separate inertial position, rate and acceleration, altitude and airspeed sensors (IMU) are installed. Each IMU is connected to a different computer within its respective group.

While the invention has been described above particularly with respect to VTOL vehicles, it will be appreciated that the invention, or various aspects of the invention as described above, may also be advantageously used with other types of aircraft control, such as by providing the control path redundancy described in FIG. 34 to collective and cyclic control mechanisms, tail rotor controls, or any other types of controls typically found in other fixed-wing or rotary-wing aircraft. Also it will be appreciated that the invention, or various aspects of the invention as described above can be advantageously used with other non flying control systems wherein the $CP_r$ is the control power required to maintain its survival or operation after the failure, as explained above.

Accordingly, while the invention has been described with respect to several preferred embodiments, it will be understood that these are set forth merely for purposes of example, and that many other variations, modifications and applications of the invention may be made within the scope of the claims.

What is claimed is:

1. An aircraft flight control system having plural control subsystems with redundancies organized so as to provide continued but degraded control power over critical aircraft flight operating parameters even if any one complete control subsystem catastrophically fails, said system comprising:
    a plurality of pilot controlled input sensors associated with each of a plurality of degrees of freedom in aircraft flight movement;
    a plurality of aircraft flight control actuators associated with each of the plurality of degrees of freedom in aircraft flight movement;
    a plurality of aircraft flight state sensors associated with each of a plurality of aircraft flight state conditions including at least altitude and speed;
    the plural control subsystems, each having at least one control computer subsystem connected to: (a) receive inputs from at least one of said pilot controlled input sensors for each of said plurality of degrees of freedom, (b) receive inputs from at least one of said flight state sensors for each of said plurality of aircraft flight conditions, and (c) provide outputs to at least one of said flight control actuators associated with each of said plural degrees of freedom;
    said inputs and outputs to the control computer subsystem of each of said plural control subsystems being selected such that a catastrophic and complete failure of any one of said plural control subsystems causes continued control power over critical aircraft flight parameters by remaining unfailed ones of said plural control subsystems, degraded to less than 100% of total available control power, but sufficient to permit controlled aircraft descent to a landing.

2. An aircraft flight control system as in claim 1 comprising N of said plural control subsystems, each of said plural control subsystems providing 1/N of the total available control power over said critical aircraft flight parameters when all of said plural control subsystems are functioning without impairment, and wherein N is a positive integer.

3. An aircraft flight control system as in claim 2 wherein N=4.

4. An aircraft flight control system as in claim 3 wherein:
    there are at least four pilot controlled input sensors associated with each of (a) pitch/push, (b) roll/slide, (c) pedals/yaw and (d) speed.

5. An aircraft flight control system as in claim 4 wherein said aircraft flight state sensors comprise at least four flight condition detection subsystems each of which independently monitors vehicle inertial position, rate and acceleration, altitude and airspeed.

6. An aircraft flight control system as in claim 2 for a VTOL aircraft having fore and aft lift air passage ducts with plural groups of directional control vanes disposed at each duct and wherein said control vanes are divided into groups, each group of vanes being independently controlled by one of said N control subsystems.

7. An aircraft flight control system as in claim 6 wherein each of said air passage ducts has a rotatable lift air generating fan there-within and plural control inputs associated therewith, said inputs to the control computer subsystem being grouped and connected for control by different respective ones of said N control subsystems.

8. An aircraft flight control system as in claim 7 wherein said VTOL aircraft also has at least one forward force generating propeller with plural control inputs that are connected for control by different respective ones of said N control subsystems.

9. An aircraft incorporating an aircraft flight control system as in claim 1.

10. A method for providing aircraft flight control utilizing plural control subsystems with redundancies organized so as to provide continued but degraded control power over critical aircraft flight operating parameters even if any one complete control subsystem catastrophically fails, said method comprising:
    providing a plurality of pilot controlled input sensors associated with each of a plurality of degrees of freedom in aircraft flight movement;
    providing a plurality of aircraft flight control actuators associated with each of a plurality of degrees of freedom in aircraft flight movement;
    providing a plurality of aircraft flight state sensors associated with each of a plurality of aircraft flight state conditions including at least altitude and speed;
    providing each of the plural control subsystems with at least one control computer subsystem, and connecting the at least one control computer subsystem in each of the plural control subsystems so as to: (a) receive inputs from at least one of said pilot controlled input sensors for each of said plurality of degrees of freedom, (b) receive inputs from at least one of said flight state sensors for each of said plurality of aircraft flight conditions, and (c) provide outputs to at least one of said flight control actuators associated with each of said plural degrees of freedom;
    selecting said inputs and outputs to the control computer subsystem of each of said plural control subsystems such that a catastrophic and complete failure of any one of said plural control subsystems causes continued control power over critical aircraft flight parameters by remaining unfailed ones of said plural control subsystems, degraded to less than 100% of total available control power, but sufficient to permit controlled aircraft descent to a landing.

11. A method as in claim 10 comprising providing N of said plural, control subsystems, each of said plural control subsystems independently providing 1/N of the total available control power over said critical aircraft flight parameters when all of said plural control subsystems are functioning without impairment, and where N is a positive integer.

12. A method as in claim 11 wherein N=4.

13. A method as in claim 12 wherein:
there are at least four pilot controlled input sensors associated with each of (a) pitch/push, (b) roll/slide, (c) pedals/yaw and (d) speed.

14. A method as in claim 13 wherein said aircraft flight state sensors comprise at least four flight condition detection subsystems each of which independently monitors vehicle inertial position, rate and acceleration, altitude and airspeed.

15. A method as in claim 11 for use in a VTOL aircraft having fore and aft lift air passage ducts with plural groups of directional control vanes disposed at each duct and wherein said control vanes are divided into groups, each group of vanes being independently controlled by one of said N control subsystems.

16. A method as in claim 15 wherein each of said air passage ducts has a rotatable air generating fan there-within and plural control inputs associated therewith, said lift control inputs being grouped and connected for control by different respective ones of said N control subsystems.

17. A method as in claim 16 wherein said VTOL aircraft also has at least one forward force generating propeller with plural control inputs that are connected for control by different respective ones of said N control subsystems.

18. A method as in claim 10 wherein there is provision for sharing of data between said plural control subsystems.

* * * * *